United States Patent
Ozawa

(10) Patent No.: US 9,230,343 B2
(45) Date of Patent: Jan. 5, 2016

(54) IMAGE PROCESSING APPARATUS AND STORAGE MEDIUM

(71) Applicant: Brother Kogyo Kabushiki Kaisha, Nagoya-shi, Aichi-ken (JP)

(72) Inventor: Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/466,400

(22) Filed: Aug. 22, 2014

(65) Prior Publication Data

US 2015/0055835 A1    Feb. 26, 2015

(30) Foreign Application Priority Data

Aug. 23, 2013    (JP) .................................. 2013-173695

(51) Int. Cl.
*G06K 9/00* (2006.01)
*G06T 11/00* (2006.01)

(52) U.S. Cl.
CPC ..................................... *G06T 11/00* (2013.01)

(58) Field of Classification Search
CPC .......... G06K 9/00241; G06K 9/00275; G06K 9/00295; G06T 11/00
See application file for complete search history.

(56) References Cited

U.S. PATENT DOCUMENTS

| | | | |
|---|---|---|---|
| 2007/0297649 A1 | 12/2007 | Nakanishi | |
| 2009/0177094 A1* | 7/2009 | Brown et al. | ........ A61B 5/0066 600/476 |
| 2009/0180004 A1* | 7/2009 | Shioda | ............... H04N 5/23219 348/231.2 |
| 2010/0111363 A1* | 5/2010 | Kelly | .................... G06F 21/316 382/103 |

FOREIGN PATENT DOCUMENTS

| | | |
|---|---|---|
| JP | 2005-173932 A | 6/2005 |
| JP | 2005-175684 A | 6/2005 |
| JP | 2007-235189 A | 9/2007 |
| JP | 2007-316892 A | 12/2007 |
| JP | 2009-237618 A | 10/2009 |
| JP | 2013-120954 A | 6/2013 |

* cited by examiner

*Primary Examiner* — Brian Le
(74) *Attorney, Agent, or Firm* — Banner & Witcoff, Ltd.

(57) ABSTRACT

An image processing apparatus including: a processor; and a memory storing instructions that, when executed by the processor, cause the apparatus to perform: acquiring target image data and template image data; specifying a partial image in a target image based on a result of detecting a face area; and compositing the specified partial image in a specific area in a template image, wherein, when a single face area is detected, a first partial image including the single face area and having a size determined based on a size of the single face area is specified, and, when a plurality of face areas are detected, a second partial image including at least one of the face areas, having a shape homothetic to the specific area and having a maximum size within the target image is specified.

13 Claims, 16 Drawing Sheets

IMAGE PROCESSING APPARATUS AND STORAGE MEDIUM

CROSS-REFERENCE TO RELATED APPLICATIONS

This application claims priority from Japanese Patent Application No. 2013-173695 filed on Aug. 23, 2013, the entire contents of which are incorporated herein by reference.

TECHNICAL FIELD

Aspects of the present invention relate to an image processing technique, and particularly to an image processing technique of processing image data indicating an image including a face area.

BACKGROUND

A technique is known in which image data indicating a picture image and image data indicating a frame image including a picture border are composited with each other so as to generate a composited image data. In this technique, a processing apparatus specifies a face area including a face from a picture image by using image data indicating a picture image, and extracts an image in a predetermined range including the face area. The processing apparatus generates composited image data so that the extracted image in the predetermined range is included within a picture border of a frame image.

SUMMARY

As mentioned above, it is useful to generate composited image data by compositing a plurality of image data items. For example, a composited image indicated by the composited image data is printed on a sheet by a printer, and is provided for a user's use.

In view of the above, aspects of the present invention provide a novel technique of compositing a plurality of image data items so as to generate composited image data indicating an appropriately composited image by using a technique different from the above-described technique.

(1) An image processing apparatus including: a processor; and a memory storing instructions that, when executed by the processor, cause the image processing apparatus to perform: acquiring target image data indicating a target image, which is a target of an image processing, and template image data indicating a template image; detecting a face area indicating a face in the target image; specifying a partial image in the target image based on a detection result of the face area; and generating composited image data indicating a composited image by compositing the specified partial image in a specific area in the template image, wherein, when a single face area is detected in the target image, a first partial image, which includes the single face area and has a size determined based on a size of the single face area, is specified as the partial image in the target image, and wherein, when a plurality of face areas are detected in the target image, a second partial image, which includes at least one of the plurality of face areas, has a shape homothetic to the specific area, and has a maximum size which may be taken from the target image as being homothetic to the specific area, is specified as the partial image in the target image.

According to this configuration, a partial image with an appropriate size is specified in accordance with the number of the face areas included in the target image. Therefore, it is possible to generate composited image data indicating an appropriate composited image.

In addition, the present invention can be realized in various forms, and can be realized in forms such as an image processing method, a computer program for realizing functions or methods of the apparatus, and a storage medium storing the computer program thereon.

DETAILED DESCRIPTION

A. Illustrative Embodiment

A-1: Configuration of Image Processing System 1000

Figure 1:
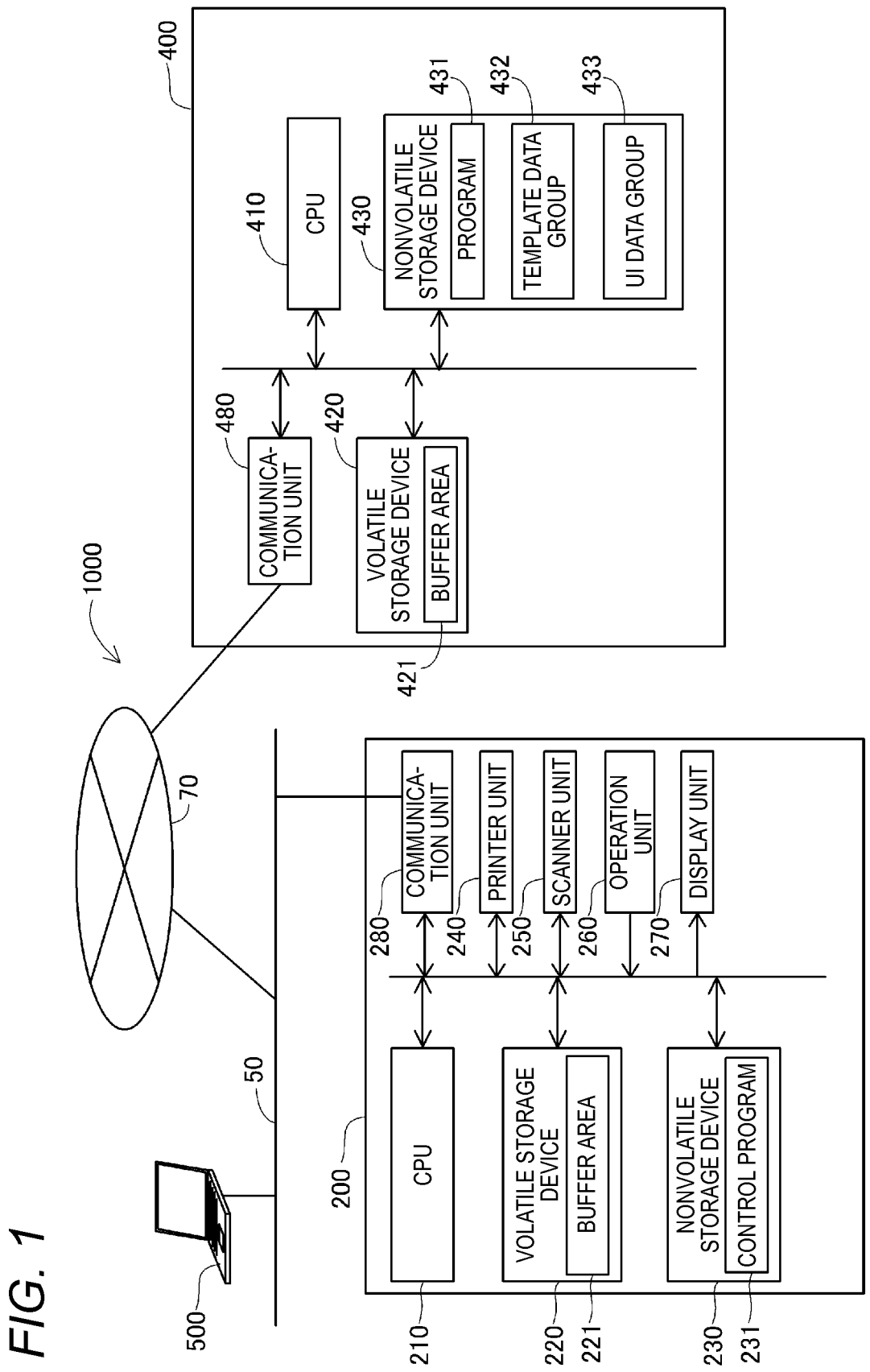
FIG. 1 is a block diagram illustrating a configuration of an image processing system according to an illustrative embodiment.

FIG. 1 is a block diagram illustrating a configuration of an image processing system 1000 in an illustrative embodiment. The image processing system 1000 includes a server 400 serving as an image processing apparatus and a multifunctional peripheral 200. The server 400 is connected to the Internet 70, and the multifunctional peripheral 200 is connected to the Internet 70 via a local area network (LAN) 50. As a result, the server 400 and the multifunctional peripheral 200 can perform communication via the LAN 50 and the Internet 70. In addition, the LAN 50 may be connected to a personal computer 500 of a user of the multifunctional peripheral 200.

The server 400 includes a CPU 410, a volatile storage device 420 such as a DRAM, a nonvolatile storage device 430 such as a hard disk drive or a flash memory, and a communication unit 480 including an interface for connection to a network such as the Internet 70. The volatile storage device 420 is provided with a buffer area 421 which temporarily stores various intermediate data items generated when the CPU 410 performs a process. The nonvolatile storage device 430 stores a computer program 431, a template data group 432 including a plurality of template data items, and a UI data group 433 described later.

The computer program 431 is provided in a form of being stored on, for example, a DVD-ROM, and is installed in the server 400 by a manager of the server 400. The CPU 410 performs image processing described later by executing the computer program 431.

Figure 2A:
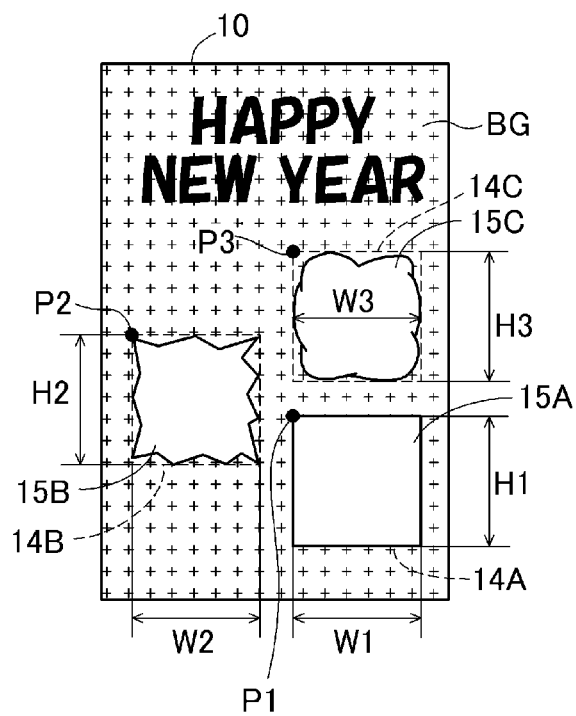
FIGS. 2A to 2C are diagrams illustrating an example of template data.
Figure 2B:
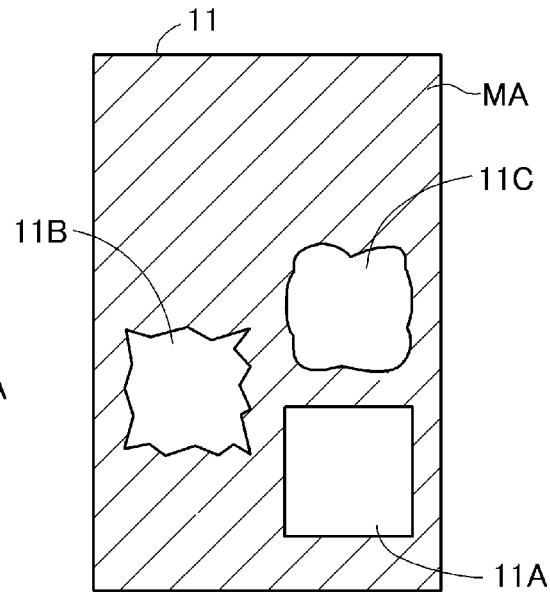
Figure 2C:
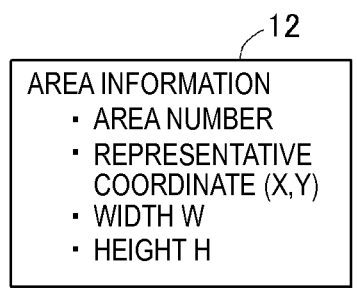

FIGS. 2A to 2C are diagrams illustrating an example of template data. A single template data item includes template image data indicating a template image 10 (FIG. 2A), mask image data indicating a mask image 11 (FIG. 2B), and area information 12. The template data is generated in a predetermined file format, for example, a portable network graphic (PNG) format.

The template image data is, for example, RGB image data. In the example of FIGS. 2A to 2C, the template image 10 includes a background image BG in which objects such as text or a pattern are designed, and three composition target areas 15A to 15C for compositing other images. The number, shapes and sizes of composition target areas, and design of the background image BG may be different for each template. The composition target areas are areas where a partial image of an original image described later is composited when a composited image is generated by using the template image 10, in an image processing described later.

The mask image 11 is an image for specifying the three composition target areas 15A to 15C in the template image 10. The mask image 11 has the same size (that is, the number of pixels in a vertical direction and the number of pixels in a horizontal direction) as that of the template image 10. A pixel in the mask image 11 has two values including a first value and a second value. The first value indicates that a corresponding pixel in the template image 10 is a pixel forming the background image BG. The second value indicates that a corresponding pixel in the template image 10 is a pixel forming the composition target areas 15A to 15C. For example, an alpha channel that defines transmittance for each pixel is used in the mask image data. In this case, for example, the first value is a value indicating that the transmittance of a pixel is 0% (for example, 255), that is, the pixel is opaque, and the second value is a value indicating that the transmittance of a pixel is 100% (for example, 0), that is, the pixel is transparent.

A hatched area MA in the mask image 11 is an area formed by a plurality of pixels having the first value. The area MA corresponds to the background image BG of the template image 10. Three areas 11A to 11C which are not hatched in the mask image 11 are areas formed by a plurality of pixels having the second value. The areas 11A to 11C correspond to the composition target areas 15A to 15C in the template image 10.

In addition, alternatively, in the mask image data, values of pixels of the areas 11A to 11C corresponding to the composition target areas 15A to 15C in the template image 10 may be area numbers (for example, 1 to 3) of corresponding composition target areas. Further, values of pixels in the area MA in the template image 10 corresponding to the background image BG may be a specific value (for example, 0) different from the area numbers.

The area information 12 is information regarding the composition target areas 15A to 15C. Specifically, the area information 12 includes area numbers as identifiers for identifying the composition target areas 15A to 15C, coordinates of representative points P1 to P3 of the composition target areas 15A to 15C, widths W1 to W3 (lengths in the horizontal direction), and heights H1 to H3 (lengths in the vertical direction). For example, a coordinate of an upper left vertex of each of circumscribed rectangles 14A to 14C, which are respectively circumscribed to the composition target areas 15A to 15C, is used as a coordinate of the representative point.

The multifunctional peripheral 200 includes a CPU 210, a volatile storage device 220 such as a DRAM, a nonvolatile storage device 230 such as a flash memory or a hard disk drive, a printer unit 240, a scanner unit 250, an operation unit 260 such as a touch panel or a button, a display unit 270 such as a liquid crystal display, and a communication unit 280 which performs communication with external apparatuses. For example, the communication unit 280 includes an interface for connection to a network such as the LAN 50, and an interface for connection to an external storage device (for example, a USB memory).

The volatile storage device 220 is provided with a buffer area 221 which temporarily stores various intermediate data items generated when the CPU 210 performs a process. The nonvolatile storage device 230 stores a control program 231.

The printer unit 240 performs printing by using a printing method such as an ink jet method or a laser method. The scanner unit 250 optically reads an original document by using a photoelectric conversion element (for example, a CCD or a CMOS) so as to generate scan data.

The CPU 210 performs control of the multifunctional peripheral 200 by executing the control program 231. For example, the CPU 210 controls the printer unit 240 or the scanner unit 250 so as to perform a copying process, a printing process, a scanning process, and the like. In addition, the CPU 210 may access the server 400 so as to perform a service use process of using a service provided by the server 400.

A-2: Operation of Image Processing System 1000

The CPU 410 of the server 400 performs an image processing of compositing an original image described later with the template image so as to generate a composited image in response to a request from the multifunctional peripheral 200 as a client. This image processing is performed in order to realize an image generation service which is provided to a client by the server 400. Hereinafter, description will be made of an operation of the image processing system 1000 including the image generation service provided by the server 400.

Figure 3:
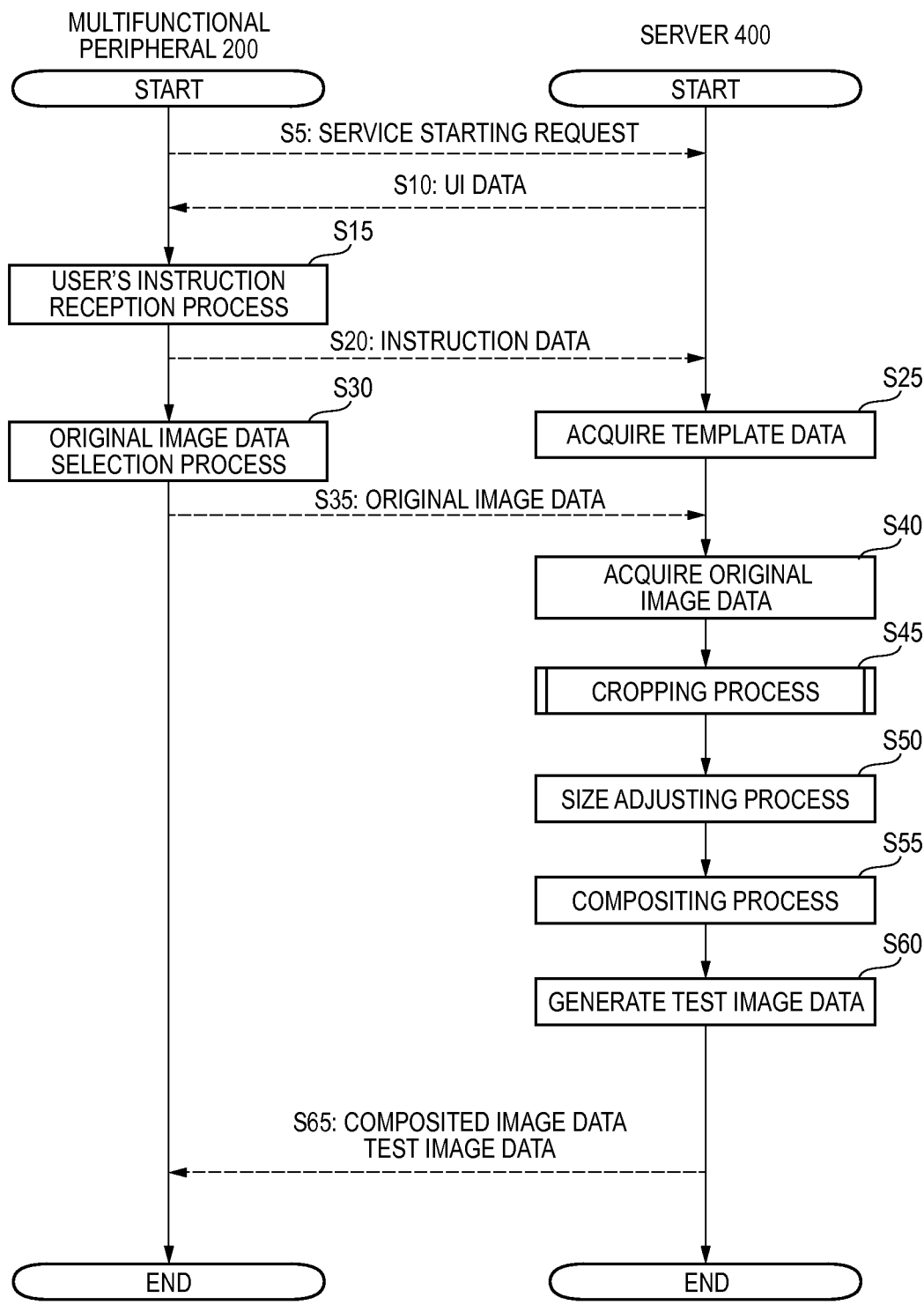
FIG. 3 is a flowchart illustrating an operation of an image processing system.

FIG. 3 is a flowchart illustrating an operation of the image processing system 1000. A process in this flowchart is started when the multifunctional peripheral 200 receives an instruction for using the image generation service provided by the server 400, from a user. The image generation service is, specifically, a service of generating a composited image to be printed on a postcard (for example, a New Year's postcard) by using image data owned by the user. The image data owned by the user is, for example, image data indicating a picture captured by a digital still camera, and is image data which is compressed in a JPEG format, for example.

When the process is started, in step S5, the CPU 210 of the multifunctional peripheral 200 transmits a service starting request to the server 400. When the service starting request is received, the CPU 410 of the server 400 selects UI data which is necessary to provide the image generation service from the UI data group 433 (FIG. 1), and transmits the UI data to the multifunctional peripheral 200 (step S10). The UI data includes, for example, various image data items required to display a UI image and control data. The control data includes, for example, various data items required for the multifunctional peripheral 200 to perform predetermined processes (specifically, processes in steps S15, S20, S30 and S35 described later) by using the UI image. For example, the control data includes information indicating a process which is to be performed by the multifunctional peripheral 200, for example, a process of transmitting predetermined information to the server 400, based on a user's instruction received via a UI image (for example, FIGS. 4A and 4B).

In step S15, the CPU 210 performs a user's instruction reception process based on the received UI data. The user's instruction reception process is a process of receiving a user's instruction required for the server 400 to provide the image generation service from the user.

Figure 4A:
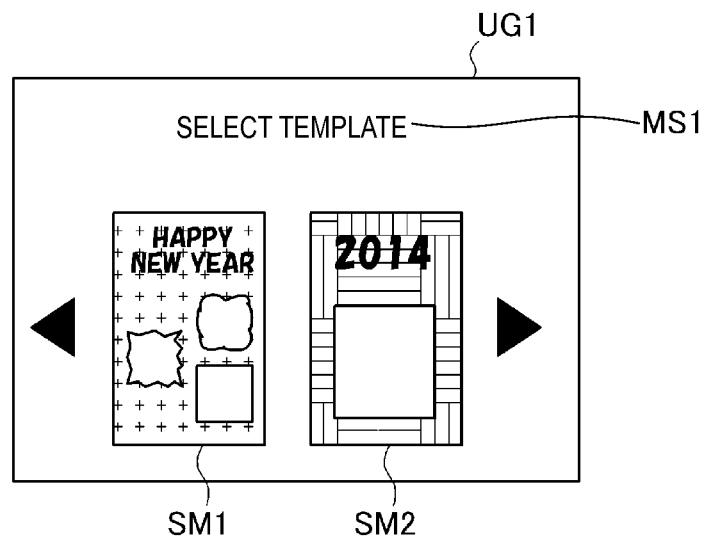
FIGS. 4A and 4B are diagrams illustrating an example of a UI image.
Figure 4B:
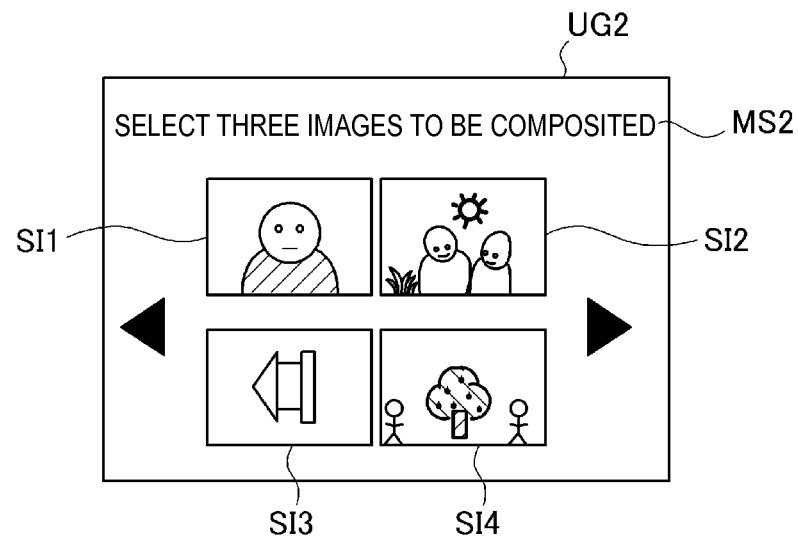

FIGS. 4A and 4B are diagrams illustrating examples of the UI image. First, the CPU 210 displays a UI image UG1 of FIG. 4A on the display unit 270, and receives selection of a template image to be used from the user. For example, the UI image UG1 includes a plurality of thumbnail images SM1 and SM2 representing a plurality of selectable template images, and a message MS1 for prompting the user to select a template image. As an image data group indicated by the UI image UG1 or the thumbnail images SM1 and SM2, a data group included in the UI data received from the server 400 is used. Next, the CPU 210 displays a predetermined UI image (not illustrated), and receives an operation mode of the image generation service from the user. In the present embodiment, the operation mode includes a "face extraction mode" and an "entirety extraction mode" as described later in detail. Depending on the operation modes, generated images are different even if a used template image and original image (described later) are the same.

In step S20, the CPU 210 transmits instruction data indicating an instruction received from the user to the server 400. The instruction data includes information for designating a template image selected by the user and information for designating an operation mode.

In step S25, the CPU 410 of the server 400 acquires template data corresponding to the template image selected by the user, from the template data group 432 (FIG. 1) stored in the nonvolatile storage device 430, based on the received instruction data. The template data may be acquired from external devices, for example, other servers or external storage devices connected to the server 400. In addition, the subsequent processes will be described by using a case where the template image 10 illustrated in FIG. 2 is selected by the user as an example.

Subsequent to transmission of the instruction data in step S20, the CPU 210 of the multifunctional peripheral 200 performs an original image data selection process (step S30). The original image data selection process is a process of selecting an image (also referred to as an original image) to be composited with the template image 10 based on the user's instruction. Specifically, the CPU 210 displays a UI image UG2 of FIG. 4B on the display unit 270, and receives selection of an original image to be used, from the user. For example, the UI image UG2 includes a plurality of thumbnail images SI1 to SI4 representing a plurality of selectable original images, and a message MS2 for prompting the user to select a template image. Image data items indicating the thumbnail images SI1 to SI4 are generated based on image data (also referred to as original image data) indicating original images.

The original image data is acquired from, for example, a storage device designated by the user. The designated storage device includes, for example, a removable medium such as a USB memory connected to the communication unit 280, an external hard disk drive, and the storage devices 220 and 230 provided in the multifunctional peripheral 200. The original image data of the present embodiment is, for example, image data owned by the user, specifically, image data which is generated by the user performing photographing by using a digital camera, or image data which is generated by using an image generation application or the like.

The CPU 210 receives selection of original images corresponding to the number of composition areas included in the template image to be used. For example, in a case where the template image 10 is used, the template image 10 includes the three composition target areas 15A to 15C for compositing other areas (FIG. 2A), and thus three original images are selected.

Figure 5A:
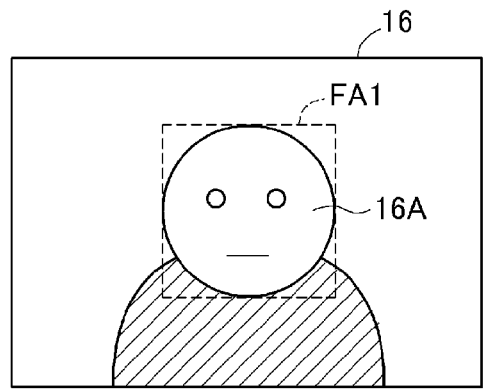
FIGS. 5A to 5D are diagrams illustrating examples of original images.
Figure 5B:
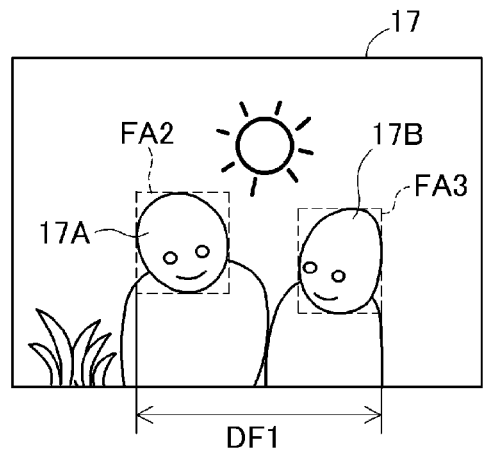
Figure 5C:
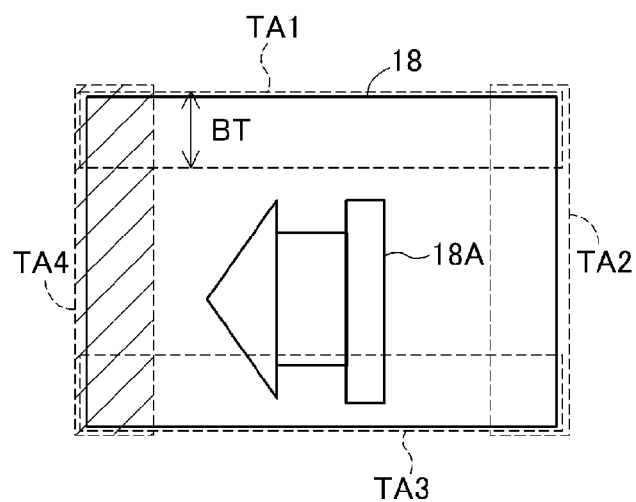
Figure 5D:
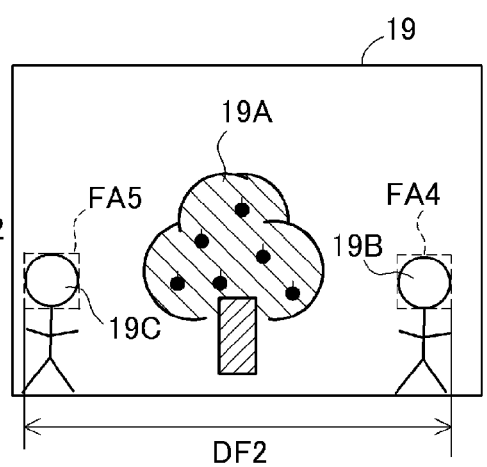

FIGS. 5A to 5D are diagrams illustrating examples of original images. The original images include an image which includes a person's face as an object and an image which does not include a person's face. For example, an original image 16 of FIG. 5A includes a single face 16A, an original image 17 of FIG. 5B includes two faces 17A and 17B, and an original image 19 of FIG. 5D includes two faces 19B and 19C. An original image 18 of FIG. 5C does not include a person's face. The original images may include an object different from a person's face, for example, a building 18A (FIG. 5C) and a tree 19A (FIG. 5D). The subsequent processes will be described based on a case where three original images 16 to 18 are selected by the user as an example. However, for convenience of description, other original images will also be referred to as an example as appropriate.

If the original images are selected, in step S35, the CPU 210 transmits three original image data items indicating the three selected original images 16 to 18 to the server 400. At this time, the CPU 210 transmits information indicating an order in which the original images are selected by the user in correlation with the original image data items. Thus, the CPU 410 of the server 400 acquires the three original image data items and the information indicating the selection order (step S40). The three composition target areas 15A to 15C of the template image 10 have a predefined processing order, and an original image whose selection order is earlier is correlated with a composition target area whose processing order is earlier. In addition, in a case where information indicating the photographing date and time (time stamp) of an original image is correlated with original image data indicating the original image, an original image whose photographing date and time are earlier may be correlated with a composition target area whose processing order is earlier.

In step S45, the CPU 410 performs a cropping process. The cropping process is a process of extracting rectangular images including partial images to be composited in the three composition target areas 15A to 15C of the template image 10, from the three original images 16 to 18, respectively.

Figure 6:
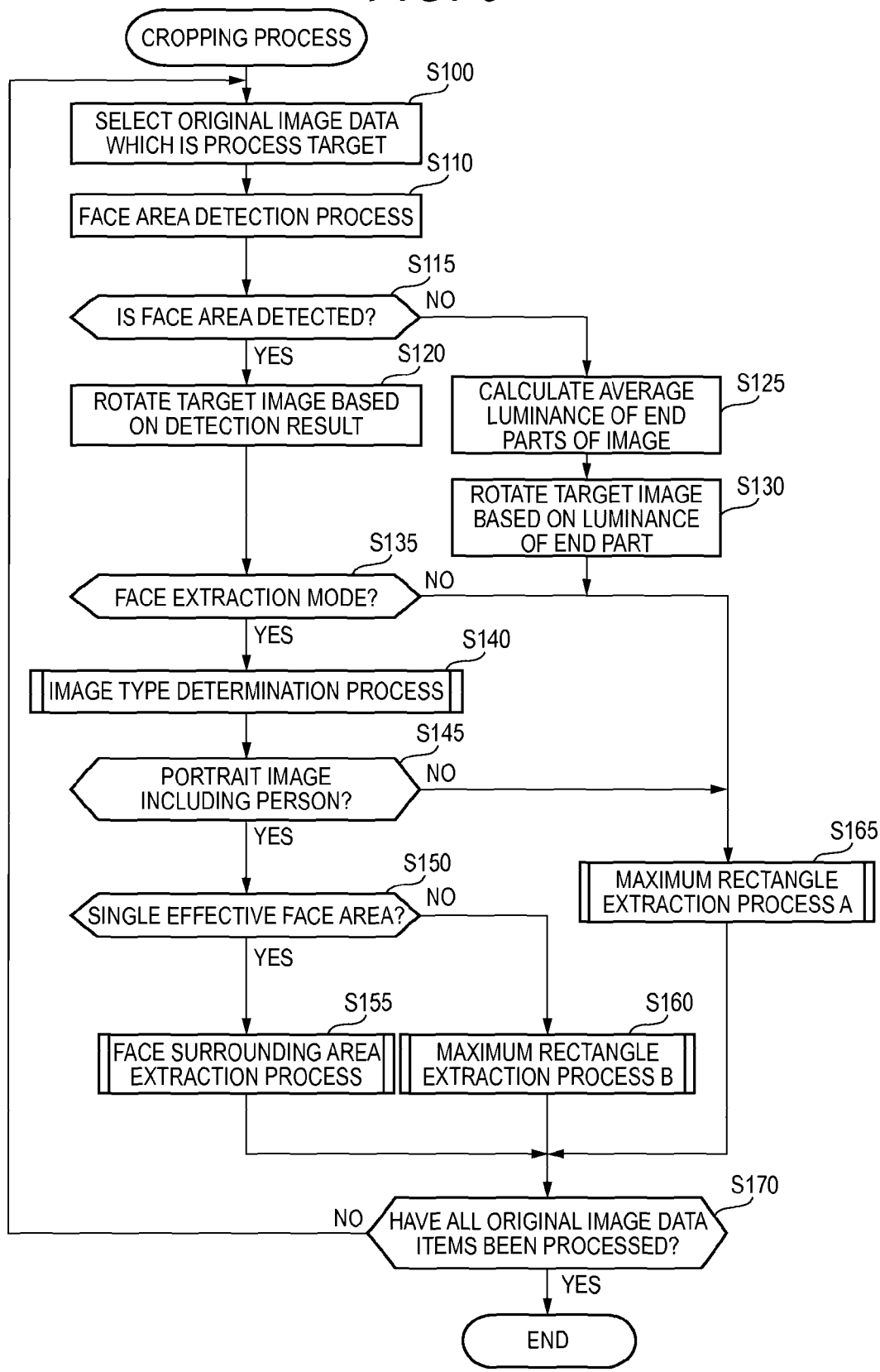
FIG. 6 is a flowchart illustrating a cropping process.

FIG. 6 is a flowchart of the cropping process. In step S100, the CPU 410 selects a single original image data item as image data (also referred to as target image data) which is a process target from the acquired original image data items.

In step S110, the CPU 410 performs a face area detection process of detecting a face area FA present in an image (also referred to as a target image) indicated by the target image data. The face area FA is an area including a face of a person included in the target image. The face area detection process is performed by using a well-known method. For example, as for the face area detection process, a convolutional neural network is known in which, for example, features are detected from a low-order feature such as an edge to a high-order feature such as the eye or the mouth in a hierarchical manner, and a centroid position of a face or an outline of the face is finally detected (for example, see JP-A-2013-120954 and JP-A-2009-237618).

In a case of using a first type of algorithm for specifying a face area including a tilted face along with angle information or the like indicating a tilt angle of the face, a face detection process is performed on a target image only in one direction. In a case of using a second type of algorithm for detecting an area of a face which is directed in a reference direction, the face detection process is performed on a target image in four directions in which the target image is rotated by 0 degrees (no rotation), 90 degrees, 180 degrees, and 270 degrees. The face which is directed in a reference direction is a face in which, for example, the top of the head is directed upward and the chin is directed downward. By the face area detection process, in the present embodiment, a circumscribed rectangle which is circumscribed to a face is specified as a face area. In other words, information indicating a position and a size of the circumscribed rectangle which is circumscribed to a face is calculated.

For example, a face area FA1 including a face 16A is detected from the original image 16 of FIG. 5A. Two face areas FA2 and FA3 including two faces 17A and 17B are detected from the original image 17 of FIG. 5B. Two face areas FA4 and FA5 including two faces 19B and 19C are detected from the original image 19 of FIG. 5D. A face area FA is not detected from the original image 18 of FIG. 5C.

In step S115, the CPU 410 determines whether or not the face area FA is detected in the target image. If the face area FA is detected (step S115: YES), the CPU 410 rotates the target image as necessary based on a detection result of the face area FA. For example, in a case where the face detection process has been performed by using the above-described first type of algorithm, the target image is rotated so that the face in the face area FA is directed in the above-described reference direction based on a tilt angle of the specified face. In addition, as a rotation angle, any one of 0 degrees (no rotation), 90 degrees, 180 degrees, and 270 degrees is used.

Further, in a case where the face detection process has been performed by using the second type of algorithm, the target image is rotated at a rotation angle at which the number of detected face areas is the largest, among the four rotation angles, that is, 0 degrees (no rotation), 90 degrees, 180 degrees, and 270 degrees during the face detection process.

In a case where a composited image is generated by using an image (for example, a picture image) including the face area FA, it is preferable that a face in the face area FA be frequently directed in the above-described reference direction in the composited image regardless of orientations of other objects. In the present embodiment, in a case where the face area FA has been detected, a rotation process is performed based on a detection result of the face area. As a result, when the target image (original image) is composited with the template image 10 in the subsequent step, the target image is composited in a state in which a face in the target image is directed in an appropriate direction. Therefore, it is possible to generate an appropriate composited image.

If the face area FA is not detected (step S115: NO), the CPU 410 calculates the average luminances of the four end parts of the target image (step S125). Specifically, as illustrated in the original image 18 of FIG. 5C, the respective average luminances of the pixels of the four strip-shaped areas TA1 to TA4 along four ends of the target image in vertical and horizontal directions are calculated. A width BT of each of the strip-shaped areas TA1 to TA4 is predefined, and is set to a length corresponding to 5% to 20% of a length in the vertical direction of the target image (also referred to as a height) or a length in the horizontal direction of the target image (also referred to as width).

In step S130, the CPU 410 rotates the target image based on the calculated average luminances of the four end parts. Specifically, the target image is rotated so that an end part having the greatest average luminance is located at the upper side among the four end parts. In a case where the target image is a picture image, there is a high probability that an upper luminance of a photographed subject may be high. This is because there is a probability that light sources such as the sun or an outside lamp when outdoors, and a room lamp when indoors may be located on an upper side of a person or in scenery which is an object. In the present embodiment, the target image can be rotated in an appropriate direction in step S130. Particularly, in a case where the face area FA is not detected, or a case where the face area detection process is not performed, the target image can be rotated in an appropriate direction. As a result, when the target image (original image) is composited with the template image 10 in the subsequent step, the target image is composited in a state in which a subject (for example, scenery) in the target image is directed in an appropriate direction. Therefore, it is possible to generate an appropriate composited image. Subsequent to step S130, a maximum rectangle extraction process A (step S165) described later is performed.

In step S135 subsequent to step S120, the CPU 410 determines whether an operation mode designated by the user is the face extraction mode or the entirety extraction mode. If an operation mode is the entirety extraction mode (step S135: NO), the CPU 410 performs the maximum rectangle extraction process A (step S165) described later. If an operation mode is the face extraction mode (step S135: YES), the CPU 410 performs an image type determination process (step S140). The face extraction mode is an operation mode in which a partial image which is to be composited in a composition target area is changed based on a detection result of the face area FA. The entirety extraction mode is an operation mode in which a partial image which is to be composited in a composition target area is determined regardless of whether or not a face area FA is present.

Figure 7:
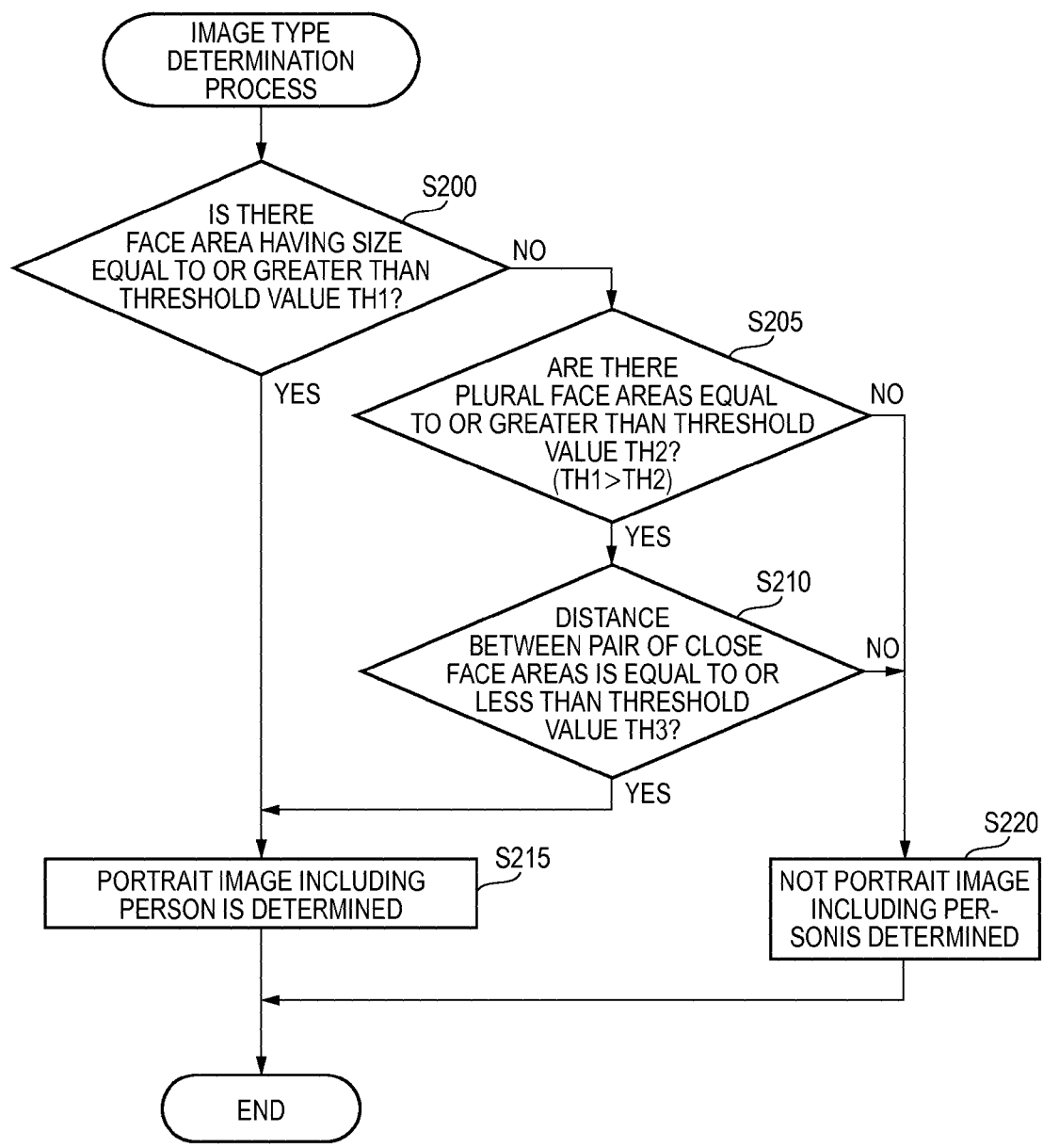
FIG. 7 is a flowchart illustrating an image type determination process.

FIG. 7 is a flowchart illustrating an image type determination process. The image type determination process is a process of determining whether a target image is a portrait image including a person or an image different from a portrait image including a person. The portrait image including a person is an image in which a person is a main object. The image different from the portrait image including a person is an image in which an object different from a person is a main object. The object different from a person includes scenery, or an artifact such as a house or a car.

In step S200, the CPU 410 determines whether or not a face area FA having a size which is equal to or greater than a first threshold value TH1 is present in the target image. The first threshold value TH1 may be, for example, a composition of a threshold value of a height and a threshold value of a width, and may be a threshold value of an area. The face area FA in the target image has been detected in step S100 of FIG. 6. The first threshold value TH1 is set to, for example, a value which is smaller than a size of a face area which may be included in a portrait of a single person. The first threshold value TH1 is a set to, for example, a value which is greater than a size of a face area which may be included in a picture including a plurality of people (for example, a family picture or a group picture). Specifically, the size of a face area which may be included in a portrait of a single person is expected to be a size corresponding to about 6% of an area of the target image. The size of a face area which may be included in a picture including a plurality of people is expected to be a size corresponding to, for example, about 3% of an area of the target image.

For example, a size of the face area FA1 of the original image 16 of FIG. 5A is determined as being equal to or greater than the first threshold value TH1. Sizes of the face areas FA2 to FA5 of the original images 17 and 19 of FIGS. 5B and 5D are determined as being smaller than the first threshold value TH1.

If there is a face area FA having a size equal to or greater than the first threshold value TH1 (step S200: YES), the CPU 410 determines that the target image is a portrait image including a person (step S215). For example, it is determined that the original image 16 of FIG. 5A is a portrait image including a person.

If there is no face area FA having a size equal to or greater than the first threshold value TH1 (step S200: NO), the CPU 410 determines whether or not there are two or more face areas FA having a size equal to or greater than a second threshold value TH2 which is less than the first threshold value TH1 (step S205). The second threshold value TH2 is set to, for example, a value which is lower than a size of a face area which may be included in a picture including a plurality of people (for example, a family picture or a group picture). For example, it is determined that sizes of the face areas FA2 to FA5 of the original images 17 and 19 of FIGS. 5B and 5D are equal to or greater than the second threshold value TH2.

If there are not two or more face areas FA having a size equal to or greater than the second threshold value TH2 (step S205: NO), the CPU 410 determines that the target image is an image different form a portrait image including a person (step S220).

If there are two or more face areas FA having a size equal to or greater than the second threshold value TH2 (step S205: YES), the CPU 410 determines whether or not a distance DF between two face areas forming a pair of closest face areas (hereinafter, also referred to as a "closest pair") is equal to or less than a third threshold value TH3 (step S210). The closest pair is a pair formed by two face areas FA whose mutual distances are the shortest among two or more face areas FA having a size equal to or greater than the second threshold value TH2. As a distance between two face areas FA, for example, a horizontal distance between a right end of a right face area FA and a left end of a left face area FA of the two face areas FA is used. FIG. 5B illustrates a distance DF1 between the face area FA2 and the face area FA3 in the original image 17. FIG. 5D illustrates a distance DF2 between the face area FA4 and the face area FA5 in the original image 19. The third threshold value TH3 is set to, for example, a length corresponding to 1/3 of a horizontal length (width) of the target image.

If the distance DF is equal to or less than the third threshold value TH3 (step S210: YES), the CPU 410 determines that the target image is a portrait image including a person (step S215). If the distance DF is greater than the third threshold value TH3 (step S210: NO), the CPU 410 determines that the target image is an image different from a portrait image including a person (step S220).

If the distance DF is relatively short, it is considered that there is a high probability that the target image is an image in which a plurality of people are main objects, for example, a family picture or a group picture. On the other hand, if the distance DF is relatively long, there is a high probability that people in the target image are not main objects of the target image. Specifically, the people in the target image may be people who are accidentally reflected at end parts in the target image when an object other than the people is photographed. For example, it is determined that the original image 17 of FIG. 5B is a portrait image including a person since the distance DF1 between the face area FA2 and the face area FA3 is relatively short. In addition, it is determined that the original image 19 of FIG. 5D is an image different from a portrait image including a person since the distance DF2 between the face area FA4 and the face area FA5 is relatively long.

According to the above-described image type determination process, the type of target image can be appropriately determined based on the number and sizes of face areas FA in the target image, and positions of face areas (specifically, a distance between two face areas). After it has been determined whether the target image is a portrait image including a person or an image different from a portrait image including a person, the image type determination process is finished.

Referring to FIG. 6 again, if it is determined that the target image is a portrait image including a person in the image type determination process (step S145: YES), the CPU 410 determines whether or not the number of effective face areas FA in the target image is one (step S150). Here, the effective face area FA is the face area FA which is taken into consideration in the above-described image type determination process (step S140). Therefore, at least one effective face area FA is present in the target image which has been determined as being a portrait image including a person.

If the number of effective face areas FA is one (step S150: YES), the CPU 410 performs a face surrounding area extraction process (step S155). The face surrounding area extraction process is a process of extracting a rectangular image which includes the single effective face area FA and has a size determined based on a size of the single effective face area FA, from the target image.

Figure 8:
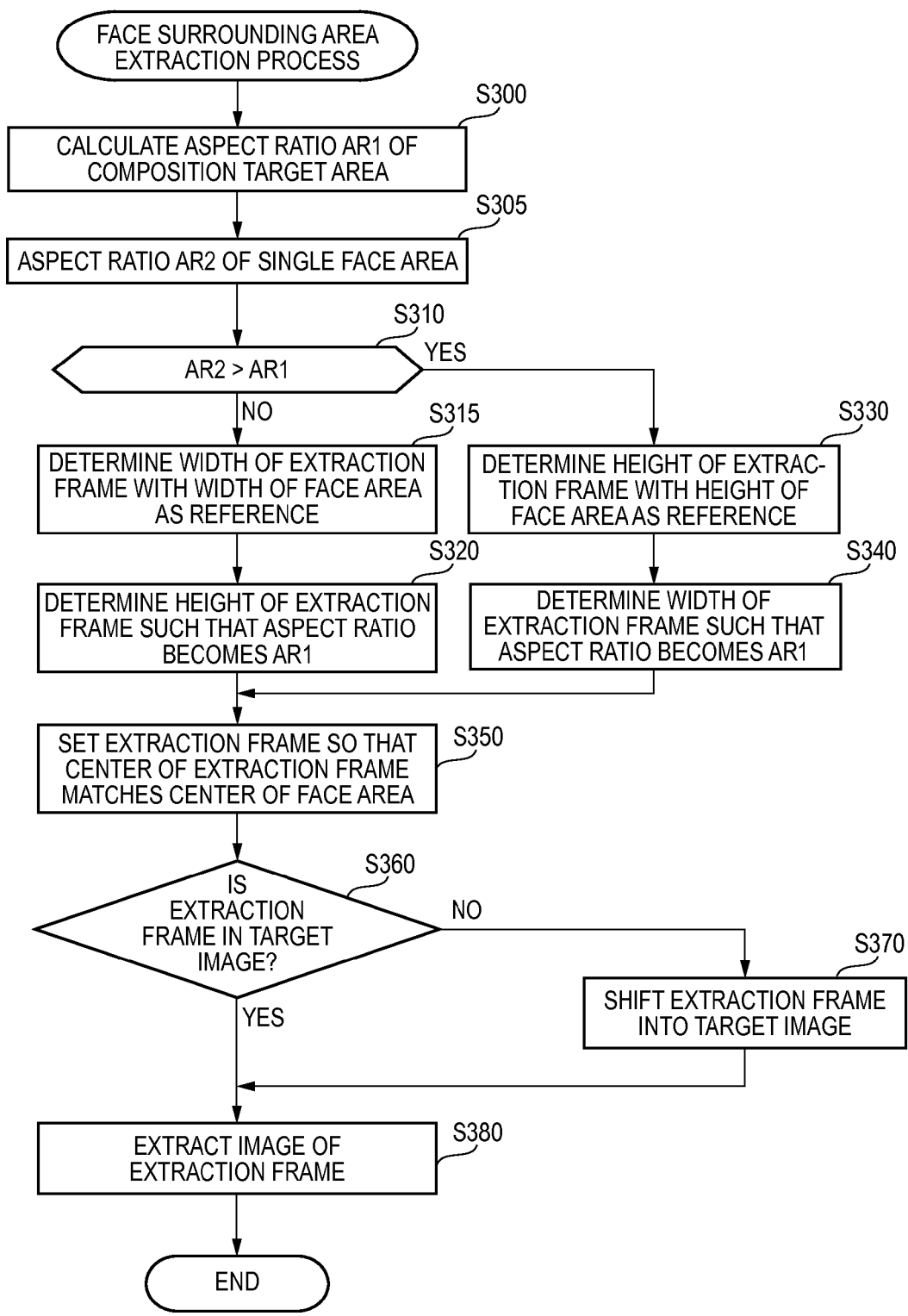
FIG. 8 is a flowchart illustrating a face surrounding area extraction process.
Figure 9A:
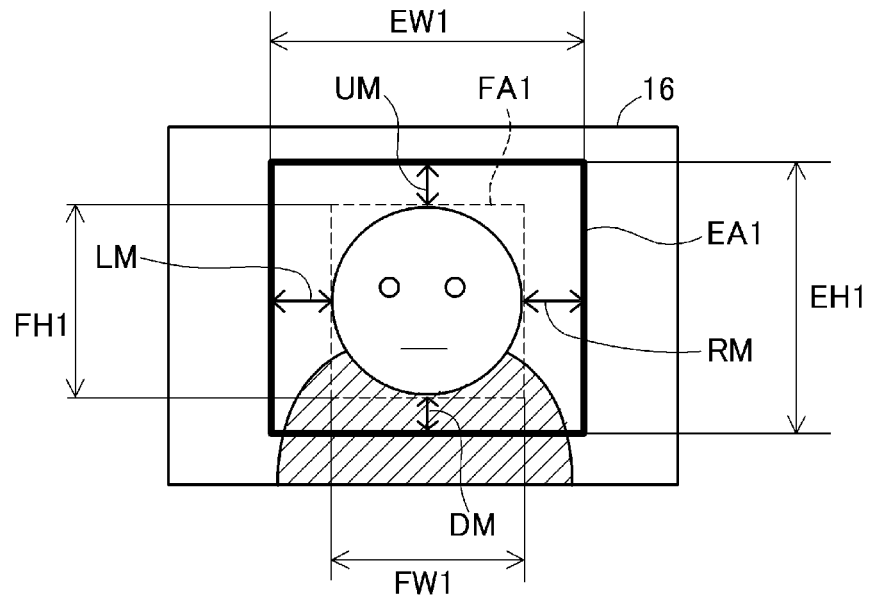
FIGS. 9A to 9C are diagrams illustrating that an extraction frame is set for a target image.
Figure 9B:
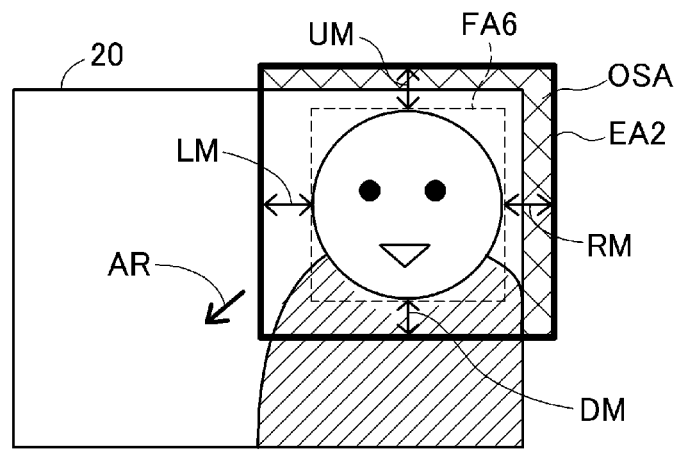
Figure 9C:
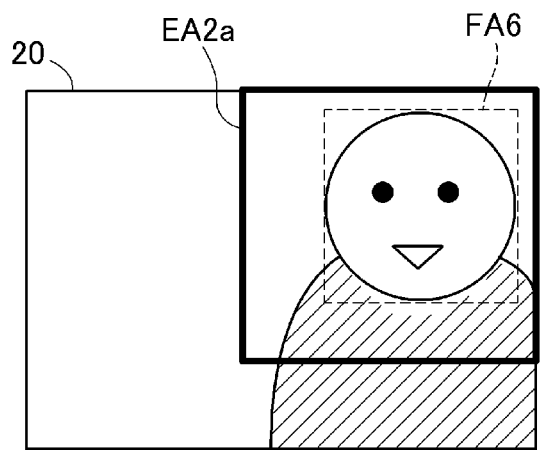

FIG. 8 is a flowchart illustrating the face surrounding area extraction process. FIGS. 9A to 9C are diagrams illustrating that an extraction frame EA is set for the target image. Hereinafter, description will be made of a case where an extraction frame EA1 is set for the face area FA1 of the original image 16 illustrated in FIGS. 9A to 9C.

In step S300, the CPU 410 calculates an aspect ratio AR1 of a composition target area which is to be composited with the target image among the composition target areas 15A to 15C in the template image 10. The aspect ratio is a ratio H/W of a vertical length (height) H to a horizontal length (width) W. The aspect ratio AR1 of the composition target area is calculated, for example, by using the area information 12 (FIG. 2C). The extraction frame EA is set to be a rectangular shape having the aspect ratio AR1 of the composition target area as described later.

As illustrated in FIGS. 2A to 2C, the composition target area may have a rectangular shape as in the composition target area 15A, but may have other exterior shapes different from the rectangular shape. For example, the composition target area 15B has an exterior shape including a plurality of sides which are relatively complicatedly disposed like a saw teeth. The composition target area 15C of FIG. 2A has an exterior shape including curves, and the composition target area 15A has a rectangular exterior shape. In addition, the composition target area may have, for example, a circular shape, or various polygonal shapes such as a triangular shape. For this reason, in the present embodiment, widths and heights of the circumscribed rectangles 14A to 14C which are respectively circumscribed to the composition target areas 15A to 15C are used as widths and heights of the composition target areas 15A to 15C (FIG. 2A). For example, the aspect ratio AR1 of the composition target area 15A is H1/W1, and the aspect ratio AR1 of the composition target area 15C is H3/W3.

In step S305, the CPU 410 calculates an aspect ratio AR2 of the face area FA. The aspect ratio AR2 of the face area FA1 of FIG. 9A is FH1/FW1 as illustrated in FIG. 9A. In step S310, the CPU 410 determines whether or not the aspect ratio AR2 of the face area FA is greater than the aspect ratio AR1 of the composition target area (step S310).

If the aspect ratio AR2 is greater than the aspect ratio AR1 (step S310: YES), the CPU 410 determines a height EH of the extraction frame EA with a height FH of the face area FA as a reference (step S330). For example, the height EH of the extraction frame EA is determined to be in a range of 100% to 150% of the height FH of the face area FA. More specifically, the height EH of the extraction frame EA is determined to be a sum of the height FH of the face area FA and twice the reference margin TM (EH=FH+2TM). In addition, after the height EH of the extraction frame EA is determined, a width EW of the extraction frame EA is determined so that an aspect ratio of the extraction frame EA is the same as the aspect ratio AR1 of the composition target area (step S340). If the aspect ratio AR2 is greater than the aspect ratio AR1, a shape of the extraction frame EA is horizontally longer than a shape of the face area FA. Therefore, if the width EW of the extraction frame EA is determined earlier than the height EH, a vertical margin between the face area FA and the extraction frame EA is smaller than the reference margin TM. Depending on the case, the height EH of the extraction frame EA is smaller than the height FH of the face area FA, and thus upper and lower ends of the face area FA which should be originally included in the extraction frame EA may not be included in the extraction frame EA. For this reason, in a case where the aspect ratio AR2 is greater than the aspect ratio AR1, the height EH of the extraction frame EA is determined earlier than the width EW in order to secure the reference margin TM in four directions of the extraction frame EA.

FIG. 9A exemplifies a case where the aspect ratio AR2 of the face area FA1 is greater than an aspect ratio of the extraction frame EA1 to be set (that is, the aspect ratio AR1 of the composition target area to be composited), that is, the extraction frame EA1 to be set is horizontally longer than a shape of the face area FA1. In this case, as described above, a height EH1 of the extraction frame EA1 is determined earlier so that vertical margins of the extraction frame EA1, that is, each of upper and lower margins UM and DM becomes the reference margin TM (EH1=FH1+2TM, step S330). Then, a width EW1 of the extraction frame EA1 is determined so that an aspect ratio of the extraction frame EA1 is the same as the aspect ratio AR1 of the composition target area (step S340).

If the aspect ratio AR2 is equal to or less than the aspect ratio AR1 (step S310: NO), the CPU 410 determines a width EW of the extraction frame EA with a width FW of the face area FA as a reference (step S315). For example, the width EW of the extraction frame EA is determined to be in a range of 100% to 150% of the width FW of the face area FA. More specifically, the width EW of the extraction frame EA is determined to be a sum of the width FW of the face area FA and twice the reference margin TM (EW=FW+2TM). In addition, after the width EW of the extraction frame EA is determined, a height EH of the extraction frame EA is determined so that an aspect ratio of the extraction frame EA is the same as the aspect ratio AR1 of the composition target area (step S320). If the aspect ratio AR2 is equal to or less than the aspect ratio AR1, a shape of the extraction frame EA is vertically longer than a shape of the face area FA. Therefore, if the height EH of the extraction frame EA is determined earlier than the width EW, a horizontal margin between the face area FA and the extraction frame EA is smaller than the reference margin TM. Depending on the case, the width EW of the extraction frame EA is smaller than the width FW of the face area FA, and thus left and right ends of the face area FA which should be originally included in the extraction frame EA may not be included in the extraction frame EA. For this reason, in a case where the aspect ratio AR2 is equal to or less than the aspect ratio AR1, the width EW of the extraction frame EA is determined earlier than the height EH in order to secure the reference margin TM in four directions of the extraction frame EA.

In step S350, the CPU 410 sets the extraction frame EA for the target image so that a center of the extraction frame EA whose size has been determined matches a center of the face area FA. As a result, the extraction frame EA can be set for the target image so that one of the vertical margin and the horizontal margin is the same as the reference margin TM, and the other margin is equal to or greater than the reference margin TM. In the example of FIG. 9A, the vertical margin of the extraction frame EA1, that is, each of upper and lower margins UM and DM becomes the reference margin TM. In addition, the horizontal margin of the extraction frame EA1, that is, each of right and left margins RM and LM is greater than the reference margin TM. The area defined by the extraction frame EA set in this step is an example of a third area.

In step S360, the CPU 410 determines whether or not the set extraction frame EA is included in the target image (that is, whether or not the set extraction frame EA protrudes outward from the target image). For example, in the example of FIG. 9A, the extraction frame EA1 is included in the original image 16. FIG. 19B illustrates an example of a case where the extraction frame EA is not included in the target image. In an original image 20 as the target image, a face area FA6 is located at a position which is relatively close to a right side and an upper side of the original image 20. For this reason, in step S350, an extraction frame EA2 set for the original image 20 includes a portion OSA (a cross-hatched part in FIG. 9B) located further outward than the original image 20.

If the set extraction frame EA is included in the target image (step S360: YES), the CPU 410 extracts a rectangular image corresponding to the extraction frame EA from the target image (step S380). In other words, the CPU 410 generates image data indicating a rectangular image which is obtained by cropping the target image with the extraction frame EA as a reference. For example, in the example of FIG. 9A, a rectangular image corresponding to the extraction frame EA1 is cropped. After the rectangular image is extracted, the face surrounding area extraction process is finished.

If the set extraction frame EA is not included in the target image (step S360: NO), that is, the extraction frame EA includes a portion which is located further outward than the target image, the CPU 410 shifts the extraction frame EA into the target image (step S370). Specifically, the CPU 410 shifts the extraction frame EA in a direction which becomes close to a center of the target image so that a side located further outward than the target image among the four sides of the extraction frame EA matches a corresponding side of the target image. For example, in the example of FIG. 9B, the extraction frame EA2 is shifted in a direction indicated by an arrow AR of FIG. 9B. FIG. 9C illustrates an extraction frame EA2a which is obtained by shifting the extraction frame EA2 of FIG. 9B. It can be seen that an upper side of the extraction frame EA2a matches an upper side of the original image 20, and a right side of the extraction frame EA2a matches the right side of the original image 20 (FIG. 9C). The area defined by the extraction frame EA2a shifted in this step is an example of a fourth area.

After the extraction frame EA is shifted, the CPU 410 extracts a rectangular image corresponding to the extraction frame EA from the target image (step S380). In other words, the CPU 410 generates image data indicating the rectangular image which is obtained by cropping the target image with the shifted extraction frame EA as a reference. For example, in the example of FIG. 9C, a rectangular image corresponding to the extraction frame EA2a is cropped. After the rectangular image is extracted, the face surrounding area extraction process is finished.

As mentioned above, in a case where the extraction frame EA is included in the target image, a rectangular image corresponding to the extraction frame EA which is disposed with a center of the face area FA as a reference is extracted, and in a case where the extraction frame EA is not included in the target image, a rectangular image corresponding to the extraction frame EA shifted into the target image is extracted. Therefore, when a partial image in the rectangular image is composited in a composition target area in the subsequent step, an appropriate partial image can be specified from the rectangular image. In other words, it is possible to specify a partial image with an appropriate size so that there is no location where the partial image cannot be composited in the composition target area, and the face area FA is appropriately disposed in the composition target area.

Referring to FIG. 6 again, if there are a plurality of effective face areas in the target image (step S150: NO), the CPU 410 performs a maximum rectangle extraction process B (step S160). On the other hand, after step S130 is performed without a face area FA being detected in step S115, if the operation mode is the entirety extraction mode (step S135: NO), or if it is determined that the target image is an image different from a portrait image including a person (step S145: NO), a maximum rectangle extraction process A is performed (step S165). The maximum rectangle extraction process B is more complex than the maximum rectangle extraction process A, and thus the maximum rectangle extraction process A is first described for better understanding.

Figure 10:
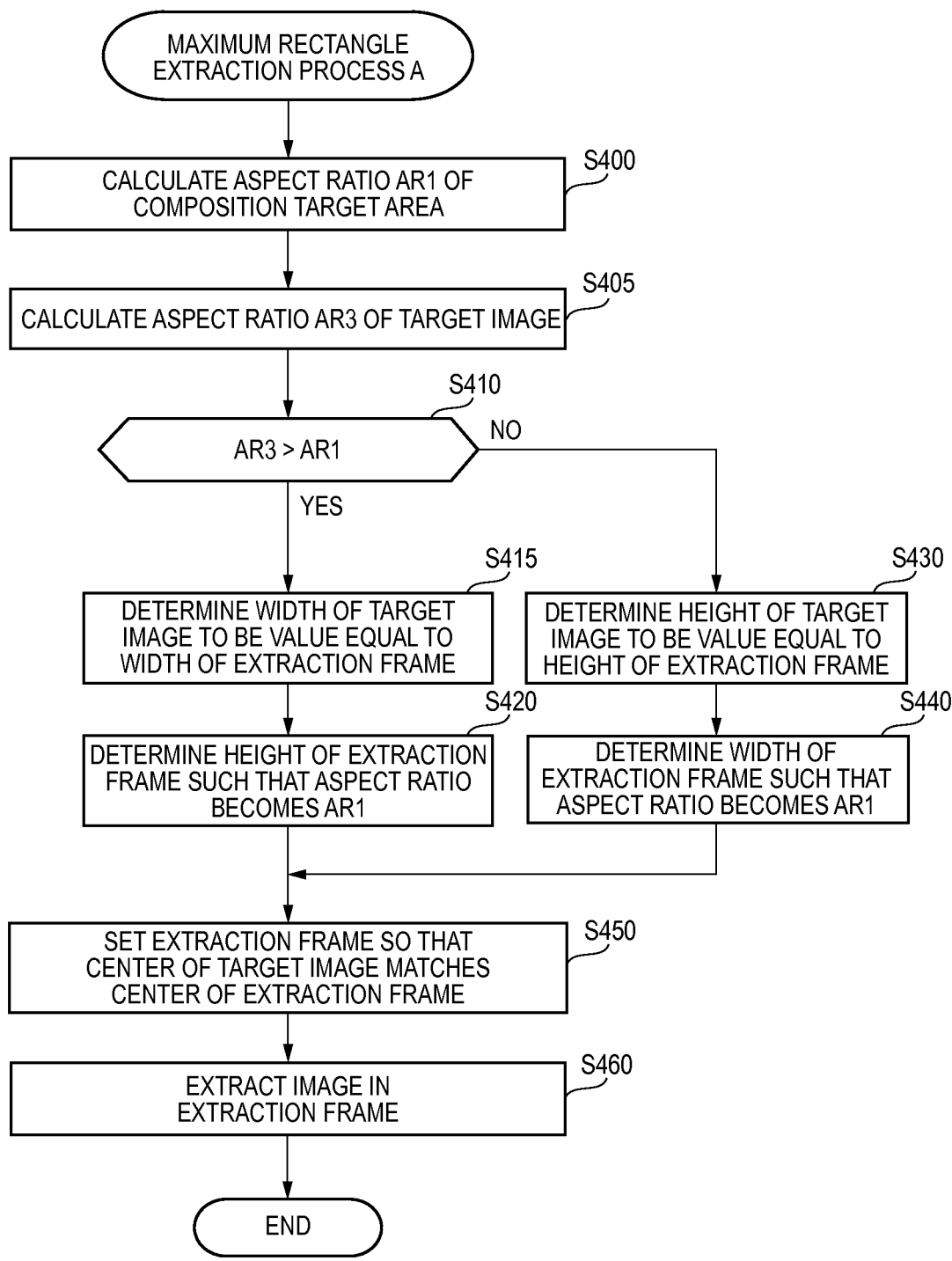
FIG. 10 is a flowchart illustrating a maximum rectangle extraction process.
Figures 11A, 11B:
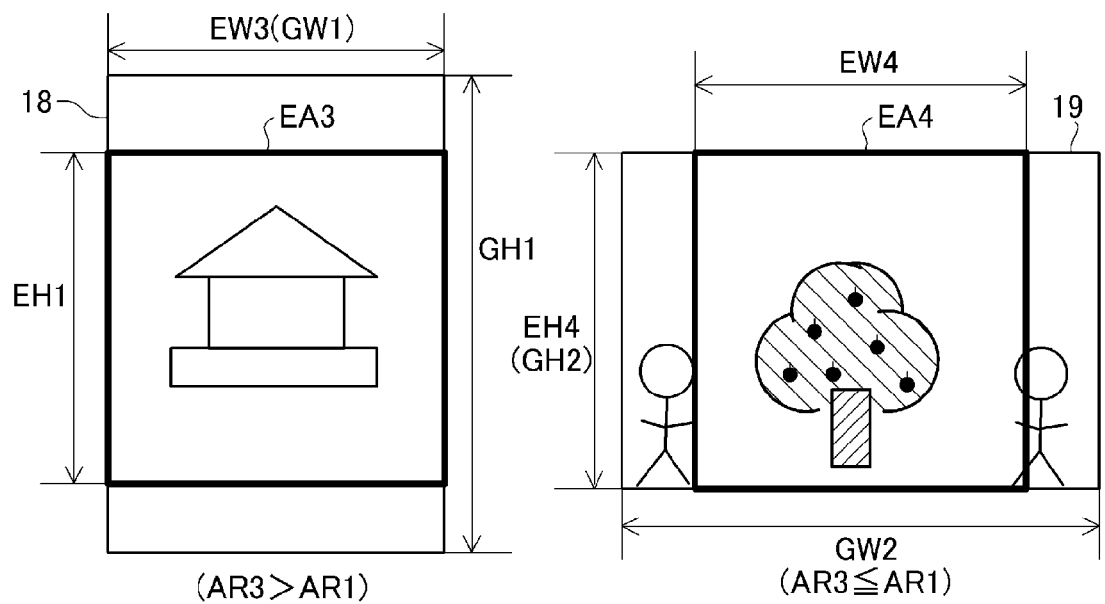
FIGS. 11A and 11B are diagrams illustrating the maximum rectangle extraction process.

FIG. 10 is a flowchart illustrating the maximum rectangle extraction process A. FIGS. 11A and 11B are diagrams illustrating the maximum rectangle extraction process A. The maximum rectangle extraction process A is a process of extracting a maximum rectangular image which has the same aspect ratio as the aspect ratio AR1 of a composition target area and can be extracted from the target image, regardless of the presence of a face area FA.

In step S400, the CPU 410 calculates the aspect ratio AR1 of the above-described composition target area. In step S405, the CPU 410 calculates an aspect ratio AR3 of the target image. In step S410, the CPU 410 determines whether or not the aspect ratio AR3 of the target image is greater than the aspect ratio AR1 of the composition target area.

If the aspect ratio AR3 is greater than the aspect ratio AR1 (step S410: YES), the CPU 410 determines a width EW of the extraction frame EA to be the same value as a width GW of the target image (step S415). In addition, after the width EW of the extraction frame EA is determined, a height EH of the extraction frame EA is determined so that an aspect ratio of the extraction frame EA is the same as the aspect ratio AR1 of the composition target area (step S420). If the aspect ratio AR3 is greater than the aspect ratio AR1, a shape of the target image is vertically longer than a shape of the extraction frame EA. Therefore, if the height EH of the extraction frame EA is determined earlier than the width EW, the extraction frame EA becomes larger than the target image. For this reason, in a case where the aspect ratio AR3 is greater than the aspect ratio AR1, the width EW of the extraction frame EA is determined earlier than the height EH in order to set the extraction frame EA within the target image.

In FIG. 11A, the aspect ratio AR3 of the original image 18 which is the target image is greater than an aspect ratio of an extraction frame EA3 to be set (that is, the aspect ratio AR1 of the composition target area to be composited). In other words, the original image 18 has a vertically longer shape than a shape of the extraction frame EA3 to be set. In this case, as described above, a width EW3 of the extraction frame EA3 is determined earlier (EW3=GW1, step S415). Then, a height EH3 of the extraction frame EA3 is determined so that the aspect ratio of the extraction frame EA3 is the same as the aspect ratio AR1 of the composition target area (step S420).

If the aspect ratio AR3 is equal to or less than the aspect ratio AR1 (step S410: NO), the CPU 410 determines the height EH of the extraction frame EA to be a value which is the same as the height GH of the target image (step S430). In addition, after the height EH of the extraction frame EA is determined, the width EW of the extraction frame EA is determined so that the aspect ratio of the extraction frame EA is the same as the aspect ratio AR1 of the composition target area (step S440). If the aspect ratio AR3 is equal to or less than the aspect ratio AR1, a shape of the target image is horizontally longer than a shape of the extraction frame EA. Therefore, if the width EW of the extraction frame EA is determined earlier than the height EH, the extraction frame EA becomes larger than the target image. For this reason, in a case where the aspect ratio AR3 is equal to or less than the aspect ratio AR1, the height EH of the extraction frame EA is determined earlier than the width EW in order to set the extraction frame EA within the target image.

In FIG. 11B, the aspect ratio AR3 of the original image 19 which is the target image is equal to or less than an aspect ratio of an extraction frame EA4 to be set (that is, the aspect ratio AR1 of the composition target area to be composited). In other words, the original image 19 has a horizontally longer shape than a shape of the extraction frame EA4 to be set. In this case, as described above, a height EH4 of the extraction frame EA4 is determined earlier (EH4=GH2, step S430). Then, a width EW4 of the extraction frame EA4 is determined so that the aspect ratio of the extraction frame EA4 is the same as the aspect ratio AR1 of the composition target area (step S440).

The size of the extraction frame EA is determined due to the processes in steps S400 to S440. The determined size is the size of a rectangle which has the same aspect ratio as the aspect ratio AR1 of the composition target area and is the size of a maximum rectangle (hereinafter, also referred to as a maximum rectangular size) which can be included in the target image.

In step S450, the CPU 410 sets the extraction frame EA for the target image so that a center of the extraction frame EA whose size has been set matches a center of the target image. In step S460, the CPU 410 extracts a rectangular image corresponding to the extraction frame EA from the target image. As a result, there is a generation of image data indicating a rectangular image which is obtained by cropping the target image with the extraction frame EA as a reference. If the rectangular image is extracted, the maximum rectangle extraction process A is finished. As described above, the width EW of the extraction frame EA is set to a value which is the same as the width GW of the target image (step S415), or the height EH of the extraction frame EA is set to a value which is the same as the height GH of the target image (step S430). Therefore, the rectangular image is extracted so that at least two sides of the upper and lower two sides and the left and right two sides of the rectangular image match the corresponding two sides of the target image.

It is possible to extract a rectangular image with a maximum rectangular size through the maximum rectangle extraction process A. As a result, when a partial image in the rectangular image is composited in a composition target area in the subsequent step, the partial image, which has a shape homothetic to the composition target area and a maximum size which may be taken from the target image as being homothetic to the specific area, can be composited with the composition target area.

Next, description will be made of the maximum rectangle extraction process B which is performed in a case where it is determined in step S150 of FIG. 6 that there are a plurality of effective face areas in the target image (step S150: NO). In the same manner as the maximum rectangle extraction process A, the maximum rectangle extraction process B is a process of setting an extraction frame EA with a maximum rectangular size and extracting a rectangular image. The maximum rectangle extraction process B is different from the maximum rectangle extraction process A in that a position of the extraction frame EA is adjusted based on positions of a plurality of face areas.

Figure 12:
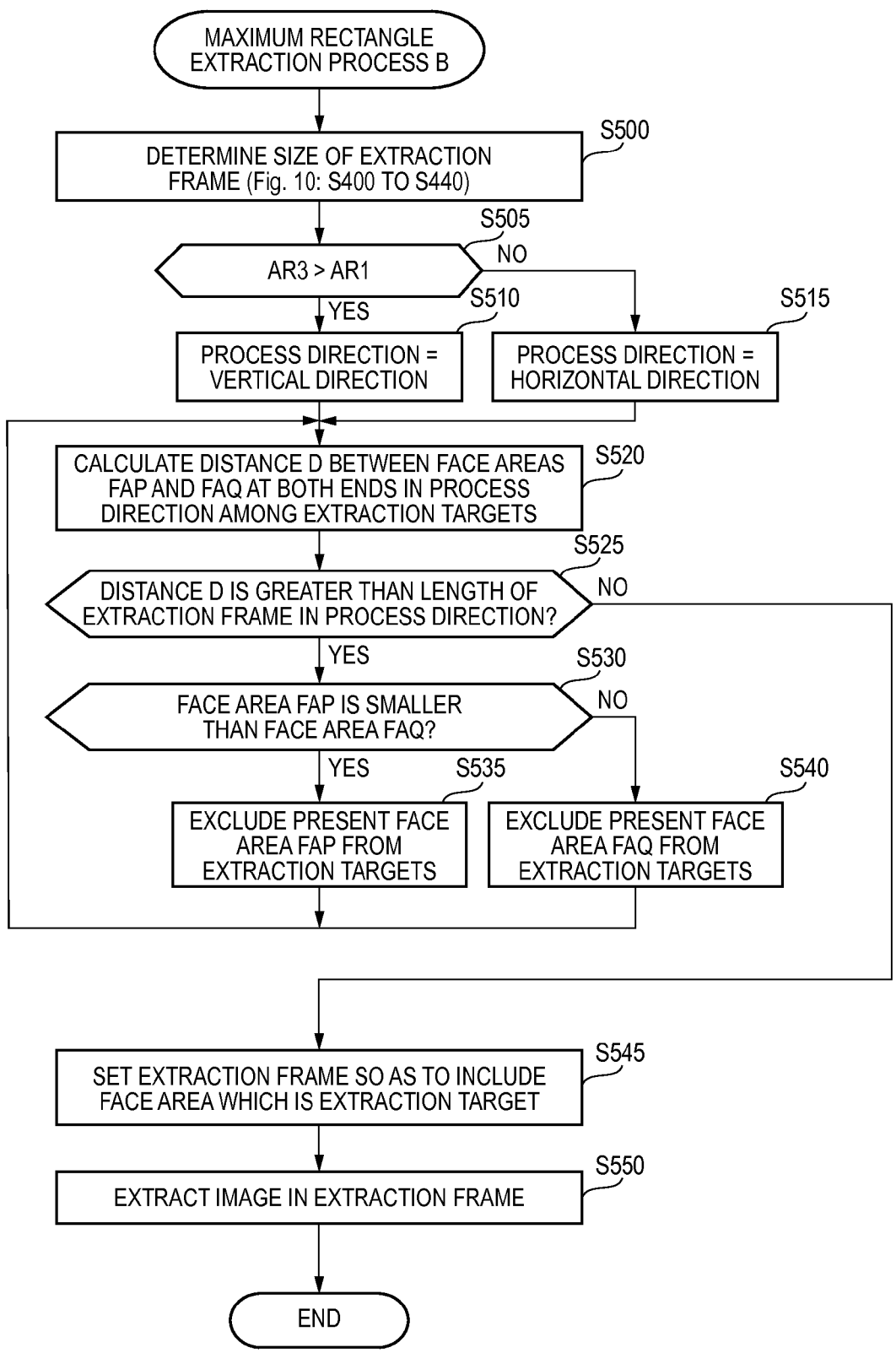
FIG. 12 is a flowchart illustrating a maximum rectangle extraction process.
Figure 13A:
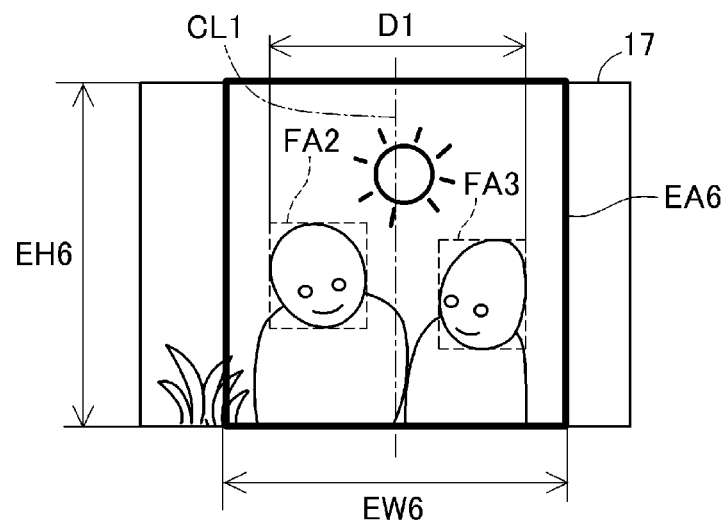
FIGS. 13A and 13B are diagrams illustrating the maximum rectangle extraction process.
Figure 13B:
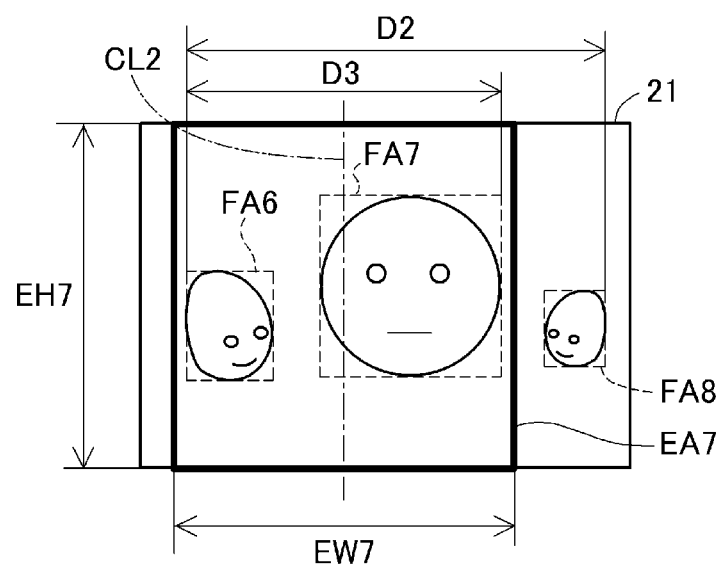

FIG. 12 is a flowchart illustrating the maximum rectangle extraction process B. FIGS. 13A and 13B are diagrams illustrating the maximum rectangle extraction process B. In step S500, the processes in steps S400 to S440 of FIG. 10 are performed. As a result, a size (maximum rectangular size) of the extraction frame EA which is to be set inside the target image is determined.

In step S505, the CPU 410 determines whether or not the aspect ratio AR3 of the target image is greater than the aspect ratio AR1 of the composition target area (that is, the aspect ratio AR1 of the extraction frame EA to be set). If the aspect ratio AR3 is greater than the aspect ratio AR1 (step S505: YES), that is, the target image has a vertically longer shape than a shape of the extraction frame EA to be set, the CPU 410 sets a process direction to a vertical direction (step S510). If the aspect ratio AR3 is equal to or less than the aspect ratio AR1 (step S505: NO), that is, the target image has a horizontally longer shape than a shape of the extraction frame EA to be set, the CPU 410 determines the process direction to be a horizontal direction (step S515). For example, in a case where original images 17 and 21 illustrated in FIGS. 13A and 13B are target images, the process direction is determined to be a horizontal direction.

If the process direction is determined, in step S520, the CPU 410 calculates a distance D between two face areas FAP and FAQ in the target image. The two face areas FAP and FAQ are two face areas located at both ends in the process direction among a plurality of face areas FA which are extraction targets. Initially, in step S520, all effective face areas in the target image are extraction targets. As described later, if step S520 is performed twice or more, some of the face areas are excluded from the extraction targets.

In a case where the original image 17 illustrated in FIG. 13A is the target image, the two effective face areas FA2 and FA3 are the two face areas FAP and FAQ between which the distance D is to be calculated. Therefore, a horizontal distance D1 between a right end of the right face area FA3 and a left end of the left face area FA2 is calculated. In a case where the original image 21 illustrated in FIG. 13B is the target image, among the three effective face areas FA6 to FA8, the right end face areas FA8 and the left end face area FA6 are the two face areas FAP and FAQ between which the distance D is to be calculated in the initial step S520. Therefore, a horizontal distance D2 between a right end of the right face area FA8 and a left end of the left face area FA6 is calculated.

In step S525, the CPU 410 determines whether or not the calculated distance D is greater than a length of the extraction frame EA in the process direction. If the process direction is a horizontal direction, it is determined whether or not the distance D is greater than the width EW of the extraction frame EA, and if the process direction is a vertical direction, it is determined whether or not the distance D is greater than the height EH of the extraction frame EA. In the example of FIG. 13A, it is determined that the distance D1 is equal to or less than a width EW6 of an extraction frame EA6. In the example of FIG. 13B, it is determined that the distance D2 is greater than a width EW7 of an extraction frame EA7.

If the distance D is greater than the length of the extraction frame EA in the process direction (step S525: YES), it can be determined that an area which includes all the face areas FA which are present extraction targets and has a maximum rectangular size is not included (not present) in the target image. In other words, it can be determined that this extraction frame EA cannot be set inside the target image. Therefore, in this case, the CPU 410 performs a process of setting an extraction frame EA different from the extraction frame EA. In other words, the CPU 410 compares sizes of the two face areas FAP and FAQ between which the distance D has been calculated with each other, and excludes a face area with a smaller size from extraction targets (steps S530 to S540). In other words, if the size of the face area FAP is smaller than the size of the face area FAQ (step S530: YES), the face area FAP is excluded from the extraction targets (step S535). In addition, if the size of the face area FAP is equal to or larger than the size of the face area FAQ (step S530: NO), the face area FAQ is excluded from the extraction targets (step S540). If a single face area is excluded from the extraction targets, the CPU 410 returns the process to step S520.

For example, in the example of FIG. 13B, the distance D2 calculated in the initial step S520 is greater than the width EW7 of the extraction frame EA7. Therefore, among the face area FA6 and the face area FA8, the face area FA8 with the smaller size is excluded from the extraction targets. In addition, in second step S520, a distance D3 between the face area FA6 and the face area FA7 is calculated.

If the distance D is equal to or less than the length of the extraction frame EA in the process direction (step S525: NO), it can be determined that the extraction frame EA with a maximum rectangular size can be set so as to include all the face areas FA which are the present extraction targets. Therefore, in this case, the CPU 410 sets the extraction frame EA with a maximum rectangular size inside the target image so as to include all the face areas FA which are the extraction targets (step S545). Specifically, the extraction frame EA is set inside the target image so that a central position in the process direction between an outer end of the face area FAP and an outer end of the face area FAQ matches a central position of the extraction frame EA in the process direction. As mentioned above, if the extraction frame EA is set inside the target image based on the central positions, the extraction frame EA can be set so that the face areas FA which are the present extraction targets are appropriately included in the extraction frame EA. As a result, a partial image in which a plurality of face areas FA are appropriately disposed can be composited with the template image 10 in the subsequent process.

For example, in the example of FIG. 13A, the distance D1 calculated in the initial step S520 is equal to or less than the width EW6 of the extraction frame EA6 to be set. Therefore, the extraction frame EA6 is set so that a central position CL1 illustrated in FIG. 13A matches a central position of the extraction frame EA6 in the horizontal direction. The central position CL1 illustrated in FIG. 13A is a central position in the horizontal direction between a right end of the right face area FA3 and a left end of the left face area FA2.

In addition, in the example of FIG. 13B, the distance D3 calculated in second step S520 is equal to or less than the width EW7 of the extraction frame EA7 to be set. Therefore, the extraction frame EA7 is set so that a central position CL2 illustrated in FIG. 13B matches a central position of the extraction frame EA7 in the horizontal direction. The central position CL2 illustrated in FIG. 13B is a central position in the horizontal direction between a right end of the right face area FA7 and a left end of the left face area FA6 of two face areas FA which are extraction targets. In other words, in the example of FIG. 13B, the extraction frame EA7 is set so that, of the two face areas FA6 and FA8 located at both ends of the original image 21 in the horizontal direction, the face area FA6 with a larger size is included, and the face area FA8 with a smaller size is not included. As a result, an appropriate partial image can be composited with the template image 10 so as to include a face area FA with a relatively large size in the subsequent process.

In step S550, the CPU 410 extracts a rectangular image corresponding to the extraction frame EA from the target image. As a result, there is generation of image data indicating a rectangular image which is obtained by cropping the target image with the extraction frame EA as a reference. After the rectangular image is extracted, the maximum rectangle extraction process B is finished.

It is possible to set a maximum rectangle which has the aspect ratio AR1 of the composition target area and can be set inside the target image as the extraction frame EA through the maximum rectangle extraction process B in the same manner as in the maximum rectangle extraction process A. In addition, the set extraction frame EA includes at least one face area FA. As a result, when a partial image in the rectangular image is composited in a composition target area in the subsequent step, the partial image, which includes at least one face area FA, has a shape homothetic to the composition target area, and has a maximum size within which may be taken from the target area as being homothetic to the specific area, can be composited in the composition target area.

If the rectangular image is extracted from the target image according to any one of the face surrounding area extraction process, the maximum rectangle extraction process A, and the maximum rectangle extraction process B, in step S170 of FIG. 6, the CPU 410 determines whether or not all original image data items have been processed as target image data items. If there is unprocessed original image data (step S170: NO), the process is returned to step S100 where the unprocessed original image data is selected, and the above-described processes in steps S100 to S160 are repeatedly performed thereon. If all the original image data items have been processed (step S170: YES), the cropping process is finished.

Figure 14A:
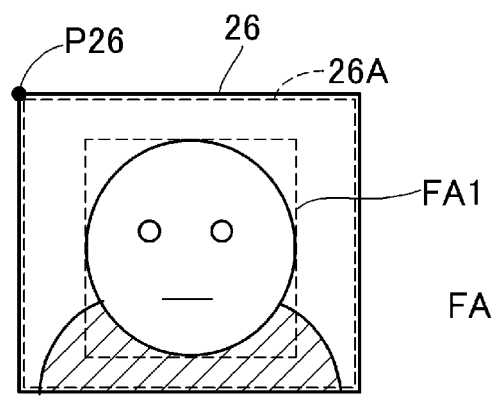
FIGS. 14A to 14C are diagrams illustrating examples of rectangular images extracted from original images.
Figure 14B:
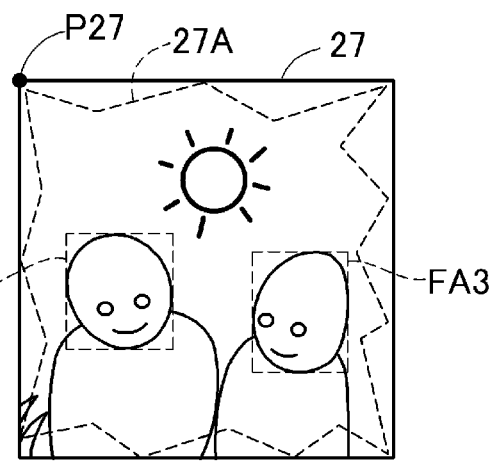
Figure 14C:
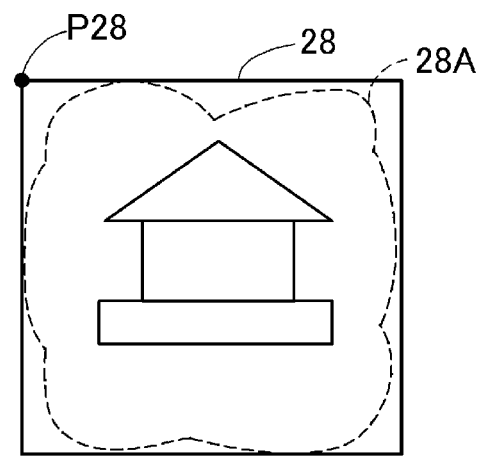
Figure 15A:
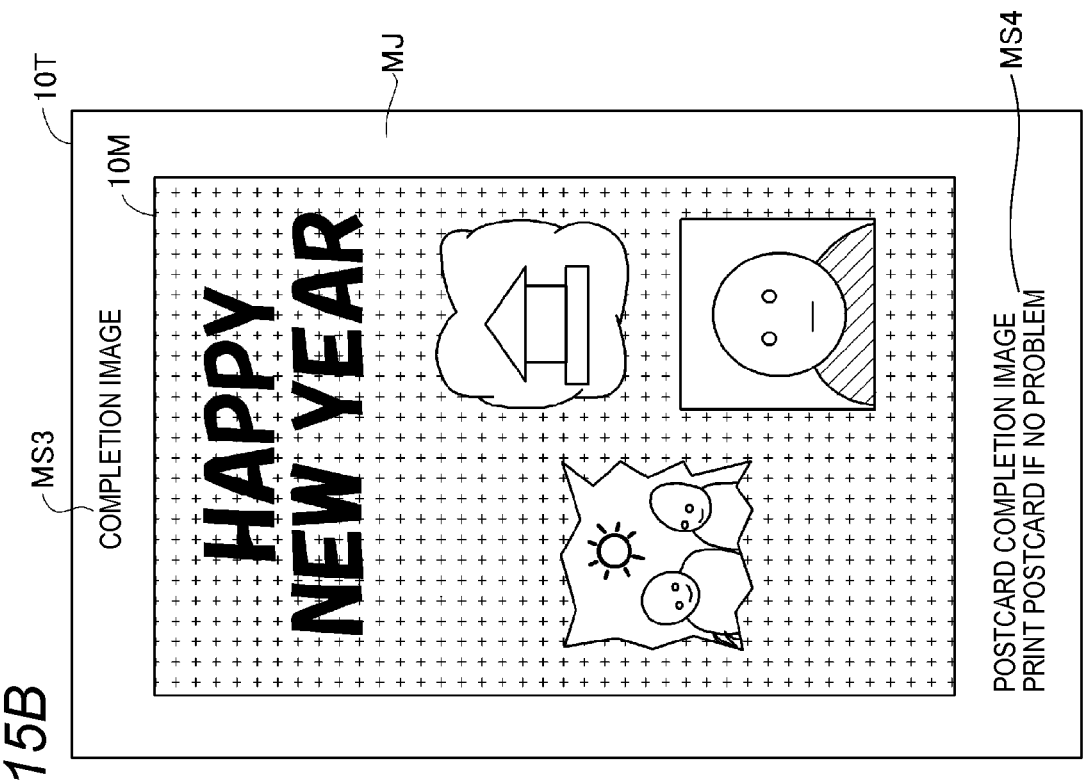
FIGS. 15A and 15B are diagrams illustrating examples of composited images which are generated.
Figure 15B:
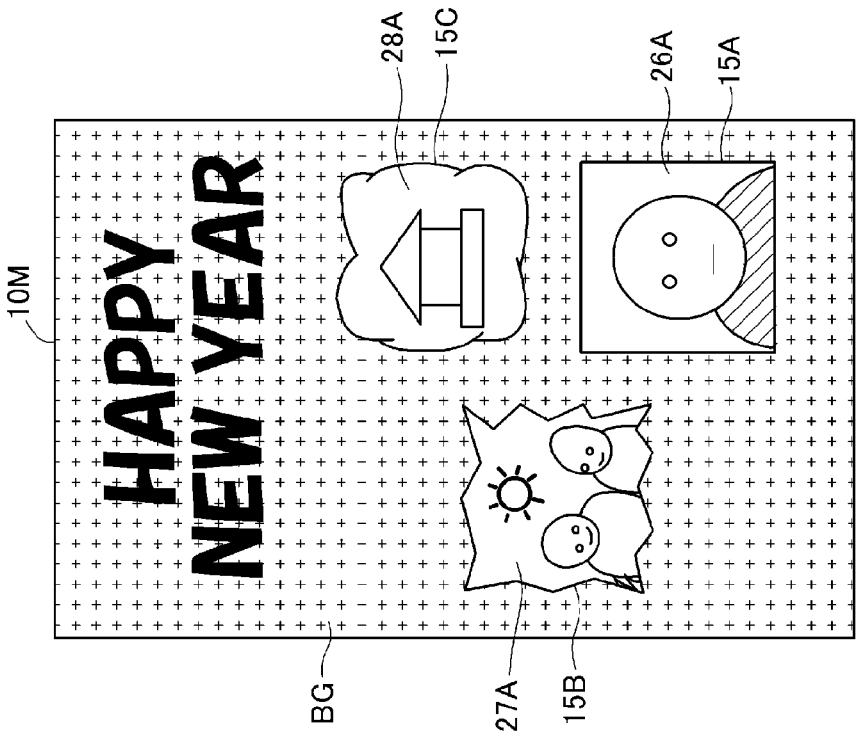

FIGS. 14A to 14C are diagrams illustrating examples of rectangular images extracted from original images. FIGS. 15A and 15B are diagrams illustrating an example of a generated composited image. FIGS. 14A to 14C respectively illustrate rectangular images 26 to 28 extracted from the original images 16 to 18 of FIGS. 5A to 5C. Through processes described in the following, the three rectangular images 26 to 28 of FIGS. 14A to 14C and the template image 10 illustrated in FIG. 2A are composited with each other, so that a composited image 10M of FIGS. 15A and 15B is generated.

After the cropping process is performed, in step S50 of FIG. 3, the CPU 410 performs a size adjusting process. The size adjusting process is a process of adjusting a size of a rectangular image extracted due to the cropping process in accordance with the size of a corresponding composition target area. A composition target area corresponding to a rectangular image is a composition target area with which a partial image inscribed in a contour of the rectangular image is to be composited. In the examples of FIGS. 14A to 15B, the rectangular images 26 to 28 respectively correspond to the composition target areas 15A to 15C of the template image 10 (FIG. 2A).

Specifically, the CPU 410 calculates a size ratio between the horizontal size of a rectangular image and the horizontal size of a circumscribed rectangle of a corresponding composition target area. The CPU 410 enlarges or reduces the rectangular image without changing an aspect ratio of the rectangular image by using the calculated size ratio. The aspect ratio of the rectangular image is extracted so as to match an aspect ratio of the composition target area, and, thus, as a result of the enlargement or the reduction, a vertical size and a horizontal size of the rectangular image match a vertical size and a horizontal size of the circumscribed rectangle of the corresponding composition target area. For example, sizes of the rectangular images 26 to 28 (FIGS. 14A to 14C) whose sizes have been adjusted respectively match sizes of the circumscribed rectangles 14A to 14C (FIG. 2A) of the composition target areas 15A to 15C.

In step S55, the CPU 410 performs a composition process of compositing a partial image in the rectangular image with a corresponding composition target area by using the rectangular image whose size has been adjusted. Specifically, the CPU 410 acquires a position (coordinate) of an upper left vertex of the composition target area on the template image 10 by referring to the area information 12 (FIG. 2C). The CPU 410 correlates a coordinate system of the template image 10 with a coordinate system of the rectangular image so that a pixel of the upper left vertex of the circumscribed rectangle of the composition target area corresponds to a pixel of the upper left vertex of the rectangular image. For example, pixels of vertices P26 to P28 (FIGS. 14A to 14C) of the rectangular images 26 to 28 are respectively correlated with pixels (FIG. 2A) of the vertices P1 to P3 of the circumscribed rectangles 14A to 14C of the composition target areas 15A to 15C.

In addition, the CPU 410 sets the pixels in the rectangular image one by one as target pixels, and performs the following process on each pixel in the rectangular image. In other words, the CPU 410 refers to a pixel in the mask image 11 (FIG. 2B), corresponding to the target pixel in the rectangular image. If a value of the pixel in the mask image 11 which is referred to is the second value, the CPU 410 replaces a color value of a pixel in the template image 10, corresponding to the pixel in the mask image 11 which is referred to, with a color value of the target pixel in the rectangular image. If a value of the pixel in the mask image 11 which is referred to is the first value, the CPU 410 maintains the color value of the pixel in the template image 10, corresponding to the pixel in the mask image 11 which is referred to, in an original value.

As a result, color values of a plurality of pixels forming the composition target areas 15A to 15C of the template image 10 are respectively replaced with color values of pixels in the corresponding rectangular images 26 to 28. In other words, partial images 26A to 28A (FIGS. 14A to 14C) to be composited are specified from the corresponding rectangular images 26 to 28, and the specified partial images 26A to 28A are composited in the composition target areas 15A to 15C (FIG. 2A) of the template image 10. Therefore, composited image data indicating the composited image 10M (FIG. 15A) is generated.

As illustrated in FIGS. 14A to 14C, the partial images 26A to 28A specified in the rectangular images 26 to 28 are images which are inscribed in the contours of the rectangular images 26 to 28 and have the same shapes and sizes as those of the composition target areas 15A to 15C.

In addition, the rectangular image 26 including a single face area FA1 is a rectangular image which is extracted from the original image 16 (FIG. 5A) through the above-described face surrounding area extraction process (FIGS. 8 and 9A). In other words, the partial image 26A (FIG. 14A) including the face area FA1 is an image which has the same aspect ratio as that of the composition target area 15A, and is inscribed in the contour of the rectangular image 26 extracted from the original image 16 in a size which is determined based on the size of the face area FA1. Therefore, the partial image 26A is a partial image of the original image 16 (FIG. 5A) and has a size which is determined based on the size of the face area FA1 in the original image 16.

In addition, the rectangular image 27 including two face areas FA2 and FA3 is a rectangular image which is extracted from the original image 17 (FIG. 5B) through the above-described maximum rectangle extraction process (FIGS. 12 and 13A). In other words, the partial image 27A (FIG. 14B) including the two face areas FA2 and FA3 is an image which has the same aspect ratio as that of the composition target area 15B and which is inscribed in the contour of the rectangular image 27 with the maximum size which can be taken from the original image 17. Therefore, the partial image 27A is a partial image of the original image 17 and is a partial image which has a shape homothetic to the composition target area 15B and the maximum size which can be taken from the original image 17.

Similarly, the rectangular image 28 which does not include an effective face area FA is a rectangular image which is extracted from the original image 18 (FIG. 5C) through the above-described maximum rectangle extraction process A (FIGS. 10 and 11A). In other words, the partial image 28A (FIG. 14C) which does not include an effective face area FA is an image which has the same aspect ratio as that of the composition target area 15C and which is inscribed in the contour of the rectangular image 28 with the maximum size which can be taken from the original image 18. Therefore, the partial image 28A is a partial image of the original image 18 and is a partial image which has a shape homothetic to the composition target area 15C and the maximum size which can be taken from the original image 18.

As can be seen from the above description, the partial image 26A is an example of a first partial image, and the partial image 27A is an example of a second partial image.

In step S60, the CPU 410 generates test image data indicating a test image 10T (FIG. 15B) by using the composited image data generated in step S55. The test image 10T includes the composited image 10M and a blank space MJ. Messages MS3 and MS4 indicating that the test image 10T is an image for test printing of the composited image 10M are disposed in the blank space MJ.

In addition, the composited image data indicating the composited image 10M is image data for printing the composited image 10M on a postcard. On the other hand, the test image data indicating the test image 10T is data for printing the test image 10T on a sheet with the A4 size which is larger than that of a postcard. A size of the composited image 10M on the postcard, which is printed on the postcard by using the composited image data, is the same as a size of the composited image 10M in the test image 10T on the sheet, which is printed on the sheet with the A4 size by using the test image data. For this reason, the user who views the test image 10T printed on the sheet with the A4 size can appropriately confirm content of the composited image 10M in a case of being printed on a postcard, without printing the composited image 10M on the postcard.

As mentioned above, the composited image 10M included in the test image 10T indicated by the test image data has the same size as that of the composited image 10M indicated by the composited image data. For this reason, the test image data can be easily generated by simply adding image data corresponding to the blank space to the composited image data. In other words, a new composited image may not be generated for the test image data.

In step S65, the CPU 410 transmits the generated composited image data and test image data to the multifunctional peripheral 200, and finishes the process. When the composited image data and the test image data are received, the CPU 210 of the multifunctional peripheral 200 stores the data in the nonvolatile storage device 230, and notifies the user that the composited image data and the test image data have been received. In addition, the CPU 210 may store the composited image data and the test image data on a removable medium such as a USB memory or a media card connected to the multifunctional peripheral 200.

The composited image data and the test image data are provided for the user's use. The user causes, for example, the multifunctional peripheral 200 to print the test image 10T on a sheet with the A4 size. In addition, the user confirms the composited image 10M included in the test image 10T printed on the sheet with the A4 size. If the user is satisfied with the content of the composited image 10M, the user causes the multifunctional peripheral 200 to print the composited image 10M on a postcard. If the user is not satisfied with the content of the composited image 10M, the user may generate the composited image 10M once more. For example, the user may change a template image or an original image to be used, so as to cause the multifunctional peripheral 200 and the server 400 to perform the process of FIG. 3 once more.

According to the illustrative embodiment, in a case where the original image 16 including a single face area FA1 is the target image, the partial image 26A which includes the face area FA1 and has a size determined based on a size of the face area FA is specified and is composited in the composition target area 15A (FIG. 8, FIGS. 9A to 9C, FIGS. 14A to 14C, and FIGS. 15A and 15B). In addition, in a case where the original image 17 including two face areas FA2 and FA3 is the target image, the CPU 410 specifies the partial image 27A which includes the two face areas FA2 and FA3, has a shape homothetic to the composition target area 15B, and has the maximum size which can be taken from the original image 17, and composites the partial image 27A in the composition target area 15B (FIGS. 12 to 15B). As a result, the partial image with an appropriate size is composited with the template image 10 in accordance with the number of face areas FA included in the target image. Therefore, the server 400 can generate composited image data indicating an appropriate composited image 10M.

For example, the embodiment is useful in a case of generating a composited image to be printed on mail such as a postcard, particularly, in a case of generating a composited image to be printed on a New Year's postcard. This is because, if an image including a plurality of people (for example, a plurality of people of the same family) is printed on a postcard, this is often intended to express actions (travel and the like) which have been performed by the plurality of people. Therefore, in this case, it may be appropriate to specify a partial image including an image (for example, an image reflected in a background behind the people) from which the actions performed by the plurality of people can be identified along with faces of the plurality of people. In addition, this is because, if an image including a single person (for example, a child) is printed on a postcard, this may be intended to express the present state (an extent of growth or the like) of the single person in most cases. In this case, it may be appropriate to specify a partial image (for example, a partial image in which the single person is closed up) with a size based on the face of the single person. Particularly, this is frequently the case for an image printed on a New Year's postcard.

In addition, in the cropping process, in a case where the original image 18 which does not include an effective face area FA is the target image, the partial image 28A which has a shape homothetic to the composition target area 15C and the maximum size which can be taken from the original image 18 is specified and is composited in the composition target area 15C (FIG. 10, FIGS. 11A and 11B, FIGS. 14A to 14C, and FIGS. 15A and 15B). As a result, the partial image with an appropriate size, specified from the target image which does not include a face area FA, is composited with the template image 10. Therefore, it is possible to generate composited image data indicating an appropriate composited image 10M.

Further, in the cropping process, in a case where a target image is a portrait image including a person, as in the partial images 26A and 27A, a partial image is specified which has a size with a face area as a reference, or the maximum size which can be taken in a shape homothetic to a composition target area, and includes an effective face area FA (steps S145 to S160 of FIG. 6). Furthermore, in a case where a target image is an image different from a portrait image including a person, as in the partial image 28A, a partial image is specified which has the maximum size in a shape homothetic to a composition target area, and is determined regardless of a face area (steps S145 and S165 of FIG. 6). As a result, in both cases where a target image is a portrait image including a person or an image different from a portrait image including a person, an appropriate partial image can be specified.

In addition, in the cropping process, in a case where an operation mode is set to the face detection mode based on an instruction from a user, the face surrounding area extraction process, and the maximum rectangle extraction processes A and B can be used based on a detection result of a face area. Further, in a case where an operation mode is set to the entirety extraction mode, only the maximum rectangle extraction process A is performed regardless of the presence of a face area. As a result, it is possible to specify an appropriate partial image complying with a user's intention.

B. Modification Examples (1) In the cropping process of the illustrative embodiment, when the process is started, a process of rotating a target image is performed so that the target image is directed in an appropriate direction (steps S110 to S135 of FIG. 6). For example, the embodiment employs the rotation process (steps S110 to S120) based on a detection result of a face area or the rotation process (steps S125 and S130) based on luminances of areas around end parts of a target image, but is not limited thereto.

Figure 16:
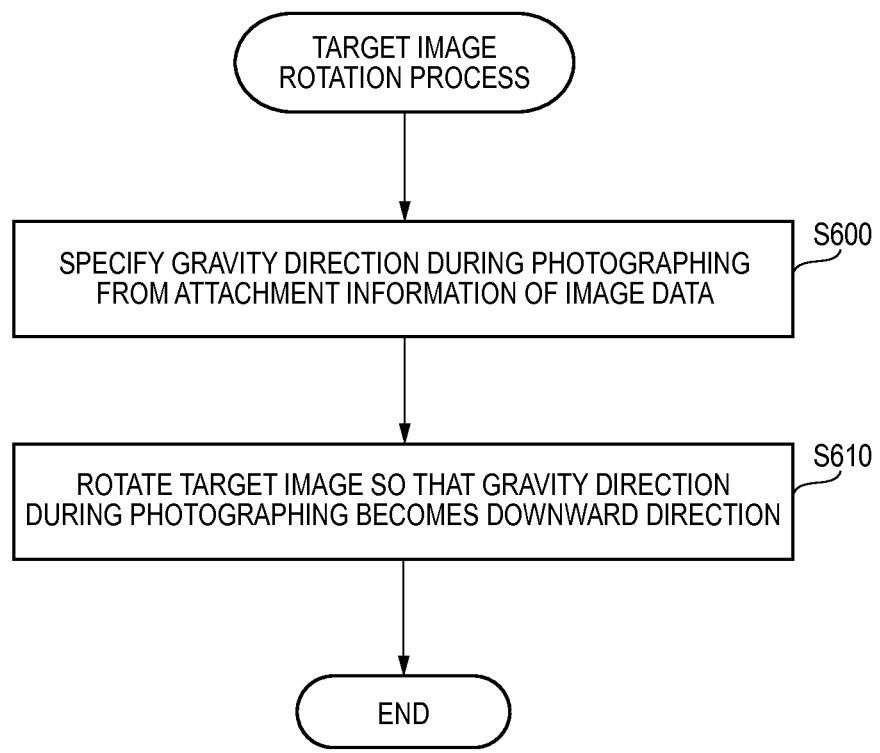
FIG. 16 is a flowchart illustrating a target image rotation process in a modification example.

FIG. 16 is a flowchart illustrating a target image rotation process of a modification example. This rotation process is performed instead of steps S110 to S135 of FIG. 6, for example. The rotation process may be used in a case where gravity information for specifying a gravity direction during photographing is correlated with original image data as attachment information (for example, metadata defined in an exchangeable image file format (Exit)). In step S600, the CPU 410 acquires corresponding gravity information from attachment information of original image data so as to specify a gravity direction during photographing. The gravity direction during photographing can be said to be information indicating a direction of an imaging device such as a digital camera. The gravity information is information generated based on gravity which is detected by using, for example, an acceleration sensor provided in a digital camera. In step S610, the CPU 410 rotates a target image so that the gravity direction during photographing becomes a downward direction. According to this modification example, it is possible to appropriately and easily rotate a target image in a case where gravity information is correlated with original image data. As a result, it is possible to generate appropriate composited image data by using a partial image which is rotated in an appropriate direction.

(2) In the embodiment, original image data is image data owned by a user, and is acquired from a storage device such as a USB memory so as to be transmitted to the server 400. Alternatively, all or some original image data may be acquired by the user optically reading an original document which is prepared by the user by using the scanner unit 250 of the multifunctional peripheral 200.

(3) In the cropping process of the embodiment, in a case where the number of face areas FA detected in a target image is one, the CPU 410 extracts a rectangular image which is determined so that predetermined margins are provided in four directions of the face area FA (FIGS. 8 and 9A). In addition, a partial image which is inscribed in a contour of the rectangular image is specified, and the partial image is composited in a corresponding composition target area (step S55). Alternatively, in a case where the number of face areas FA detected in the target image is one, and a composition target area is circular, the CPU 410 may specify a circular partial image which has a radius based on a size of the face area FA and centers on a centroid of the face area FA, and may composite the circular partial image with a circular composition target area. In addition, in a case where the number of face areas FA detected in the target image is one, and a composition target area has a star shape, the CPU 410 may specify a star-shaped partial image which has a radius based on a size of the face area FA and is circumscribed to a circle centering on a centroid of the face area FA, and may composite the star-shaped partial image with a start-shaped composition target area. Generally speaking, in a case where the number of face areas FA detected in the target image is one, the CPU 410 may specify a partial image which includes the face area FA and has a size which is determined based on a size of the face area FA, and may composite the partial image in a composition target area. Further, the specified partial image preferably has a shape homothetic to a composition target area.

(4) In the cropping process of the embodiment, in a case where a plurality of face areas FA are detected in the target image, the CPU 410 extracts a rectangular image which is determined so that the face areas FA which are target images are included, by using the distance D between two face areas among the plurality of face areas FA (FIGS. 12 to 13B). Further, a partial image which is inscribed in a contour of the rectangular image is specified, and the partial image is composited in a corresponding composition target area (step S55). Alternatively, in a case where a plurality of face areas FA are detected in the target image, and a composition target area has a circular shape, the CPU 410 may specify a circular partial image which is inscribed in the target image and includes one or more face areas FA, and may composite the circular partial image in the circular composition target area. In addition, in a case where a plurality of face areas FA are detected in the target image, and a composition target area has a star shape, the CPU 410 may specify a star-shaped partial image which is inscribed in the target image and includes one or more face areas FA, and may composite the star-shaped partial image in the star-shaped composition target area. Generally speaking, in a case where a plurality of face areas FA are detected in a target image, the CPU 410 may specify a partial image which includes one or more face areas FA, has a shape homothetic to a composition target area, and the maximum size which may be taken from the target image as being homothetic to the composition target area, and may composite the partial image with the composition target area.

(5) In the maximum rectangle extraction process B (FIGS. 12 to 13B) of the embodiment, in a case where an extraction frame EA which includes all face areas FA in the target image and has a maximum rectangular size cannot be set (step S525: NO), a face area with a smaller size of the two face areas FAP and FAQ located at both ends of the target image is excluded from an extraction target among face areas FA which are extraction targets (steps S530 to S540). Further, the extraction frame EA which includes remaining face areas excluding the face area with a smaller size and has an aspect ratio AR1 of a composition target area is set. Alternatively, in a case where an extraction frame EA which includes all face areas FA in a target image and has a maximum rectangular size cannot be set, an extraction frame EA which includes the largest number of face areas FA may be set, among extraction frames EA which have a maximum rectangular size and are set so as to include at least a maximum size face area FA among all face areas FA in the target image. Generally speaking, in a case where a first area which includes all face areas FA in a target image and has a maximum rectangular size cannot be set as an extraction frame EA, the CPU 410 may set a second area different from the first area as an extraction frame EA.

(6) In the cropping process (FIG. 6) of the embodiment, some of the process steps may be omitted as appropriate. For example, the image rotation process (steps S120, S125 and S130) may be omitted, and the operation mode determination (step S135) or the image type determination process (step S140) may also be omitted as appropriate.

(7) In the embodiment, as illustrated in FIG. 2A, in the template image 10, the frames representing the composition target areas 15A to 15C are explicitly provided. Therefore, the composition target areas 15A to 15C can be specified by using template image data indicating the template image 10, and the composition target areas 15A to 15C can be specified by using mask image data indicating the mask image 11 (FIG. 2B). Alternatively, a template image may use an image in which frames representing composition target areas are not explicitly provided, for example, a scenery image indicated by image data owned by a user. In other words, a composition target area may not be specified by using template image data, and a composition target area may be specified by using only mask image data. In this case, an image in an area corresponding to a composition target area defined on a mask image in the scenery image is erased, and a partial image in an original image is composited in the area.

(8) In the embodiment, image processing (for example, the processes in steps S45 to S60 of FIG. 3) performed by the CPU 410 of the server 400 may be performed by apparatuses different from the server 400, for example, the CPU 210 of the multifunctional peripheral 200. In this case, for example, after a composited image is generated, the CPU 210 outputs test image data or composited image data to the printer unit 240, so that the printer unit 240 prints the test image 10T or the composited image 10M (FIGS. 15A and 15B). In addition, these image processing may be performed by a CPU (not illustrated) of the personal computer 500 (FIG. 1) connected to a printing device such as a printer. In this case, after a composited image is generated, the CPU outputs test image data or composited image data to an external printer, so that the external printer prints the test image 10T or the composited image 10M (FIGS. 15A and 15B). In other words, the output of test image data or composited image data includes not only transmission from the server 400 to a client apparatus (for example, the multifunctional peripheral 200) as in the embodiment, but also supply from the CPU 210 to the printer unit 240 inside the multifunctional peripheral 200, transmission from the personal computer 500 to an external printer, and the like.

(9) These image processing may be performed by, for example, the scanner unit 250 of the multifunctional peripheral 200, or a scanner driver which is installed in the personal computer 500 in order to control a single scanner (not illustrated). In addition, the server 400 may be configured by a single computer as in the embodiment, or may be configured by a computing system including a plurality of computers (for example, a distributed computing system realizing so-called cloud computing). For example, the server 400 may be a server system including a first apparatus which provides (transmits) UI data to the multifunctional peripheral 200 and a second apparatus which performs the image processing. In this case, for example, the process in step S10 of FIG. 3 may be performed by the first apparatus, and the processes in steps S25 to S65 of FIG. 3 may be performed by the second apparatus.

(10) In the embodiments, some configurations realized by hardware may be realized by software, and, conversely, some configurations realized by software may be realized by hardware.

The present invention provides illustrative, non-limiting examples as follows:

(1) An image processing apparatus including: a processor; and a memory storing instructions that, when executed by the processor, cause the image processing apparatus to perform: acquiring target image data indicating a target image, which is a target of an image processing, and template image data indicating a template image; detecting a face area indicating a face in the target image; specifying a partial image in the target image based on a detection result of the face area; and generating composited image data indicating a composited image by compositing the specified partial image in a specific area in the template image, wherein, when a single face area is detected in the target image, a first partial image, which includes the single face area and has a size determined based on a size of the single face area, is specified as the partial image in the target image, and wherein, when a plurality of face areas are detected in the target image, a second partial image, which includes at least one of the plurality of face areas, has a shape homothetic to the specific area, and has a maximum size which may be taken from the target image as being homothetic to the specific area, is specified as the partial image in the target image.

According to this configuration, a partial image with an appropriate size is specified in accordance with the number of the face areas included in the target image. Therefore, it is possible to generate composited image data indicating an appropriate composited image.

(2) The image processing apparatus according to (1), wherein, when the face area is not detected in the target image, a third partial image, which has a shape homothetic to the specific area and has a maximum size within the target image, is specified as the partial image in the target image.

According to this configuration, it is possible to specify a partial image with an appropriate size from the target image which does not include the face area.

(3) The image processing apparatus according to (1) or (2), wherein the instructions stored in the memory, when executed by the processor, cause the image processing apparatus to further perform: determining, when the plurality of face areas are detected in the target image, whether or not the target image includes a first area, which includes the plurality of detected face areas, has a shape homothetic to the specific area, and has the maximum size within the target image, and wherein, when the target image includes the first area, an image in the first area is specified as the second partial image, and, when the target image does not include the first area, an image in a second area different from the first area is specified as the second partial image.

According to this configuration, images including the plurality of detected face areas are preferentially specified as the second partial image, and thus it is possible to specify an appropriate second partial image.

(4) The image processing apparatus according to (3), wherein the determining of whether or not the target image includes the first area includes determining whether or not a distance in a specific direction between a first face area and a second face area among the plurality of detected face areas is less than a reference value, the first face area being closest to a first end of the target image in the specific direction and the second face area being closest to a second end of the target image in a direction opposite to the specific direction, and wherein, when the distance in the specific direction between the first face area and the second face area is less than the reference value, the second partial image is specified based on a central position in the specific direction between the first face area and the second face area.

According to this configuration, it is possible to specify the second partial image in which a plurality of face areas are appropriately disposed based on a central position in the specific direction between the first face area and the second face area.

(5) The image processing apparatus according to (3) or (4), wherein the determining of whether or not the target image includes the first area includes determining whether or not a distance in a specific direction between a first face area and a second face area among the plurality of detected face areas is less than a reference value, the first face area being closest to a first end of the target image in the specific direction and the second face area being closest to a second end of the target image in a direction opposite to the specific direction, and wherein, when the distance in the specific direction between the first face area and the second face area is equal to or greater than the reference value, an image including a face area having a larger size among the first face area and the second face area and not including a face area having a smaller size among the first face area and the second face area is specified as the second partial image.

According to this configuration, it is possible to specify an appropriate second partial image so as to include a face area having a relatively large size.

(6) The image processing apparatus according to any one of (1) to (5), wherein, when a third area, which has a size of the partial image to be specified and is determined based on a position of the face area to be included in the partial image, is included in the target image, an image in the third area is specified as the partial image, and wherein, when the third area includes a portion located further outward than the target image, an image in a fourth area, which is obtained by shifting the third area in a direction which becomes closer to a center of the target image, is specified as the partial image.

According to this configuration, it is possible to appropriately specify a partial image having a desired size.

(7) The image processing apparatus according to any one of (1) to (6), wherein the instructions stored in the memory, when executed by the processor, cause the image processing apparatus to further perform: determining whether or not the target image is a portrait image including a person, wherein, when the target image is determined to be the portrait image including a person, either the first partial image or the second partial image is specified as the partial image in the target image, and wherein, when the target image is an image different from the portrait image including a person, a third partial image, which has a shape homothetic to the specific area and has the maximum size within the target image, is specified as the partial image in the target image.

According to this configuration, in a case where a target image is an image different from a portrait image including a person, it is possible to specify an appropriate partial image.

(8) The image processing apparatus according to any one of (1) to (7), wherein the instructions stored in the memory, when executed by the processor, cause the image processing apparatus to further perform: selecting one mode from among a plurality of process modes including a first mode and a second mode based on an instruction from a user, wherein, when the first mode is selected, either the first partial image or the second partial image is specified as the partial image in the target image based on the detection result of the face area, and wherein, when the second mode is selected, an image having a size, which is determined regardless of whether or not the face area is present in the target image, is specified as the partial image.

According to this configuration, it is possible to specify an appropriate partial image complying with a user's intention.

(9) The image processing apparatus according to any one of (1) to (8), wherein the instructions stored in the memory, when executed by the processor, cause the image processing apparatus to further perform: rotating the partial image based on the detection result of the face area, and wherein the composited image data is generated by compositing the rotated partial image with the specific area in the template image.

According to this configuration, it is possible to generate an appropriate composited image data by using a partial image which is rotated in an appropriate direction.

(10) The image processing apparatus according to any one of (1) to (8), wherein the instructions stored in the memory, when executed by the processor, cause the image processing apparatus to further perform: acquiring information which is correlated with the target image data and indicates a direction of an imaging device when the target image is captured; and rotating the partial image based on the information indicating the direction of the imaging device when the target image is captured, and wherein the composited image data is generated by compositing the rotated partial image with the specific area in the template image.

According to this configuration, it is possible to generate an appropriate composited image data by using a partial image which is rotated in an appropriate direction.

(11) The image processing apparatus according to any one of (1) to (8), wherein the instructions stored in the memory, when executed by the processor, cause the image processing apparatus to further perform: comparing luminances of a plurality of end areas along a plurality of ends of the target image with each other; and rotating the partial image so that an end at which the luminance of a corresponding end area is the highest among the plurality of ends is located at an upper side, and wherein the composited image data is generated by compositing the rotated partial image with the specific area in the template image.

According to this configuration, it is possible to generate an appropriate composited image data by using a partial image which is rotated in an appropriate direction.

(12) The image processing apparatus according to any one of (1) to (11), wherein the instructions stored in the memory, when executed by the processor, cause the image processing apparatus to further perform: controlling output of the composited image data, wherein the controlling of the output of the composited image data includes outputting, as the composited image data, first composited image data indicating the composited image and second composited image data indicating an image including the composited image and a blank space, wherein the first composited image data is data for printing the composited image on a first type of sheet, wherein the second composited image data is data for printing the image including the composited image and the blank space on a second type of sheet larger than the first type of sheet, and wherein a size of the composited image printed on the first type of sheet based on the first composited image data is the same as a size of the composited image printed on the second type of sheet based on the second composited image data.

According to this configuration, since an image is printed on the second type of sheet by using the second composited image data, content of the composited image can be appropriately confirmed without printing the composited image on the first type of sheet.

(13) A non-transitory computer-readable storage medium having a computer program stored thereon and readable by a computer of an image processing apparatus, the computer, when executed by the computer, causing the image processing apparatus to perform operations including: acquiring target image data indicating a target image, which is a target of an image processing, and template image data indicating a template image; detecting a face area indicating a face in the target image; specifying a partial image in the target image based on a detection result of the face area; and compositing the specified partial image in a specific area in the template image so as to generate composited image data indicating a composited image, wherein, when a single face area is detected in the target image, a first partial image, which includes the single face area and has a size determined based on a size of the single face area, is specified as the partial image in the target image, and wherein, when a plurality of face areas are detected in the target image, a second partial image, which includes at least one of the plurality of face areas, has a shape homothetic to the specific area in the template image, and has a maximum size which may be taken from the target image as being homothetic to the specific area, is specified as the partial image in the target image.

What is claimed is:

1. An image processing apparatus comprising:
  a processor; and
  a memory storing instructions that, when executed by the processor, cause the image processing apparatus to perform:
    acquiring target image data indicating a target image, which is a target of an image processing, and template image data indicating a template image;
    detecting a face area indicating a face in the target image;
    specifying a partial image in the target image based on a detection result of the face area; and
    generating composited image data indicating a composited image by compositing the specified partial image in a specific area in the template image,
    wherein, when a single face area is detected in the target image, a first partial image, which includes the single face area and has a size determined based on a size of the single face area, is specified as the partial image in the target image, and
    wherein, when a plurality of face areas are detected in the target image, a second partial image, which includes at least one of the plurality of face areas, has a shape homothetic to the specific area, and has a maximum size which may be taken from the target image as being homothetic to the specific area, is specified as the partial image in the target image.

2. The image processing apparatus according to claim 1, wherein, when the face area is not detected in the target image, a third partial image, which has a shape homothetic to the specific area and has a maximum size within the target image, is specified as the partial image in the target image.

3. The image processing apparatus according to claim 1, wherein the instructions stored in the memory, when executed by the processor, cause the image processing apparatus to further perform:
  determining, when the plurality of face areas are detected in the target image, whether or not the target image includes a first area, which includes the plurality of detected face areas, has a shape homothetic to the specific area, and has the maximum size within the target image, and
  wherein, when the target image includes the first area, an image in the first area is specified as the second partial image, and, when the target image does not include the first area, an image in a second area different from the first area is specified as the second partial image.

4. The image processing apparatus according to claim 3, wherein the determining of whether or not the target image includes the first area includes determining whether or not a distance in a specific direction between a first face area and a second face area among the plurality of detected face areas is less than a reference value, the first face area being closest to a first end of the target image in the specific direction and the second face area being closest to a second end of the target image in a direction opposite to the specific direction, and
wherein, when the distance in the specific direction between the first face area and the second face area is less than the reference value, the second partial image is specified based on a central position in the specific direction between the first face area and the second face area.

5. The image processing apparatus according to claim 3, wherein the determining of whether or not the target image includes the first area includes determining whether or not a distance in a specific direction between a first face area and a second face area among the plurality of detected face areas is less than a reference value, the first face area being closest to a first end of the target image in the specific direction and the second face area being closest to a second end of the target image in a direction opposite to the specific direction, and
wherein, when the distance in the specific direction between the first face area and the second face area is equal to or greater than the reference value, an image including a face area having a larger size among the first face area and the second face area and not including a face area having a smaller size among the first face area and the second face area is specified as the second partial image.

6. The image processing apparatus according to claim 1,
wherein, when a third area, which has a size of the partial image to be specified and is determined based on a position of the face area to be included in the partial image, is included in the target image, an image in the third area is specified as the partial image, and
wherein, when the third area includes a portion located further outward than the target image, an image in a fourth area, which is obtained by shifting the third area in a direction which becomes closer to a center of the target image, is specified as the partial image.

7. The image processing apparatus according to claim 1,
wherein the instructions stored in the memory, when executed by the processor, cause the image processing apparatus to further perform:
determining whether or not the target image is a portrait image including a person,
wherein, when the target image is determined to be the portrait image including a person, either the first partial image or the second partial image is specified as the partial image in the target image, and
wherein, when the target image is an image different from the portrait image including a person, a third partial image, which has a shape homothetic to the specific area and has the maximum size within the target image, is specified as the partial image in the target image.

8. The image processing apparatus according to claim 1,
wherein the instructions stored in the memory, when executed by the processor, cause the image processing apparatus to further perform:
selecting one mode from among a plurality of process modes including a first mode and a second mode based on an instruction from a user,
wherein, when the first mode is selected, either the first partial image or the second partial image is specified as the partial image in the target image based on the detection result of the face area, and
wherein, when the second mode is selected, an image having a size, which is determined regardless of whether or not the face area is present in the target image, is specified as the partial image.

9. The image processing apparatus according to claim 1,
wherein the instructions stored in the memory, when executed by the processor, cause the image processing apparatus to further perform:
rotating the partial image based on the detection result of the face area, and
wherein the composited image data is generated by compositing the rotated partial image with the specific area in the template image.

10. The image processing apparatus according to claim 1,
wherein the instructions stored in the memory, when executed by the processor, cause the image processing apparatus to further perform:
acquiring information which is correlated with the target image data and indicates a direction of an imaging device when the target image is captured; and
rotating the partial image based on the information indicating the direction of the imaging device when the target image is captured, and
wherein the composited image data is generated by compositing the rotated partial image with the specific area in the template image.

11. The image processing apparatus according to claim 1,
wherein the instructions stored in the memory, when executed by the processor, cause the image processing apparatus to further perform:
comparing luminances of a plurality of end areas along a plurality of ends of the target image with each other; and
rotating the partial image so that an end at which the luminance of a corresponding end area is the highest among the plurality of ends is located at an upper side, and
wherein the composited image data is generated by compositing the rotated partial image with the specific area in the template image.

12. The image processing apparatus according to claim 1,
wherein the instructions stored in the memory, when executed by the processor, cause the image processing apparatus to further perform:
controlling output of the composited image data,
wherein the controlling of the output of the composited image data includes outputting, as the composited image data, first composited image data indicating the composited image and second composited image data indicating an image including the composited image and a blank space,
wherein the first composited image data is data for printing the composited image on a first type of sheet,
wherein the second composited image data is data for printing the image including the composited image and the blank space on a second type of sheet larger than the first type of sheet, and
wherein a size of the composited image printed on the first type of sheet based on the first composited image data is the same as a size of the composited image printed on the second type of sheet based on the second composited image data.

13. A non-transitory computer-readable storage medium having a computer program stored thereon and readable by a computer of an image processing apparatus, the computer, when executed by the computer, causing the image processing apparatus to perform operations comprising:
acquiring target image data indicating a target image, which is a target of an image processing, and template image data indicating a template image;
detecting a face area indicating a face in the target image;
specifying a partial image in the target image based on a detection result of the face area; and
generating composited image data indicating a composited image by compositing the specified partial image in a specific area in the template image,
wherein, when a single face area is detected in the target image, a first partial image, which includes the single face area and has a size determined based on a size of the single face area, is specified as the partial image in the target image, and
wherein, when a plurality of face areas are detected in the target image, a second partial image, which includes at least one of the plurality of face areas, has a shape homothetic to the specific area in the template image, and has a maximum size which may be taken from the target image as being homothetic to the specific area, is specified as the partial image in the target image.

* * * * *